United States Patent
Minami et al.

(10) Patent No.: US 8,929,189 B2
(45) Date of Patent: Jan. 6, 2015

(54) OBJECTIVE LENS AND OPTICAL PICKUP DEVICE

(71) Applicant: Panasonic Corporation, Osaka (JP)

(72) Inventors: Kazuhiro Minami, Osaka (JP); Yasuhiro Tanaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/829,777

(22) Filed: Mar. 14, 2013

(65) Prior Publication Data

US 2013/0223201 A1     Aug. 29, 2013

Related U.S. Application Data

(63) Continuation of application No. PCT/JP2012/004991, filed on Aug. 6, 2012.

(30) Foreign Application Priority Data

Aug. 25, 2011   (JP) ................................. 2011-183271

(51) Int. Cl.
| | | |
|---|---|---|
| G11B 7/00 | (2006.01) | |
| G11B 7/135 | (2012.01) | |
| G02B 13/00 | (2006.01) | |
| G11B 7/1392 | (2012.01) | |
| G02B 3/04 | (2006.01) | |
| G02B 13/18 | (2006.01) | |
| G02B 27/00 | (2006.01) | |
| G11B 7/1374 | (2012.01) | |
| G02B 5/18 | (2006.01) | |
| G11B 7/24009 | (2013.01) | |

(52) U.S. Cl.
CPC .............. *G11B 7/1374* (2013.01); *G02B 13/00* (2013.01); *G11B 7/13922* (2013.01); *G02B 3/04* (2013.01); *G02B 13/18* (2013.01); *G02B 27/0025* (2013.01); *G11B 7/24009* (2013.01); *G02B 5/1814* (2013.01)
USPC .................. 369/112.23; 359/708; 369/112.08; 369/44.32

(58) Field of Classification Search
USPC ......................................... 359/708, 719, 721
See application file for complete search history.

(56) References Cited

U.S. PATENT DOCUMENTS

| | | | | |
|---|---|---|---|---|
| 8,228,777 | B2 * | 7/2012 | Anju et al. ............... | 369/112.23 |
| 2008/0080066 | A1 | 4/2008 | Saito | |

(Continued)

FOREIGN PATENT DOCUMENTS

| | | |
|---|---|---|
| EP | 0 247 441 A1 | 12/1987 |
| JP | 62-273634 A | 11/1987 |

(Continued)

OTHER PUBLICATIONS

International Search Report issued in International Application No. PCT/JP2012/004991 dated Nov. 6, 2012.

*Primary Examiner* — Wayne Young
*Assistant Examiner* — Dionne Pendleton
(74) *Attorney, Agent, or Firm* — McDermott Will & Emery LLP

(57) ABSTRACT

An objective lens capable of converging light of a used wavelength with a satisfactory aberration on a recording medium is provided. An objective lens for converging light of a predetermined wavelength λ on a recording medium satisfies the following condition: |CML|+|CMF|<0.03λ, where CML is an amount of a generated third-order coma aberration per 1 degree of tilt of the objective lens, and CMF is an amount of a generated third-order coma aberration per 1 degree of tilt of off-axis light.

8 Claims, 16 Drawing Sheets

(56) References Cited

U.S. PATENT DOCUMENTS

| | | |
|---|---|---|
| 2009/0257338 A1* | 10/2009 | Ueda et al. ............... 369/112.23 |
| 2010/0188960 A1* | 7/2010 | Yasui |
| 2010/0246343 A1* | 9/2010 | Yamasaki et al. .......... 369/44.32 |
| 2011/0110208 A1 | 5/2011 | Yanagisawa |
| 2011/0110217 A1* | 5/2011 | Aiba et al. ............... 369/112.23 |

FOREIGN PATENT DOCUMENTS

| | | |
|---|---|---|
| JP | 2003-279851 A | 10/2003 |
| JP | 2008-84490 A | 4/2008 |
| WO | WO-2010/007665 A1 | 1/2010 |

* cited by examiner

OBJECTIVE LENS AND OPTICAL PICKUP DEVICE

CROSS REFERENCE TO RELATED APPLICATION

This application is a continuation application of international patent application No. PCT/JP2012/004991, filed on Aug. 6, 2012, which claims priority to Japanese Patent Application No. 2011-183271, filed on Aug. 25, 2011. The foregoing applications are hereby incorporated herein by reference.

BACKGROUND

1. Field

The present disclosure relates to an objective lens for performing at least one of recording, reproduction, and erasing of information on a tape-shaped recording medium by using light, and relates to an optical pickup device including the objective lens.

2. Description of the Related Art

Japanese Laid-Open Patent Publication No. 62-273634 discloses a tape for recording and/or reproducing information by using laser light, and a method of using the tape. In the method disclosed in Japanese Laid-Open Patent Publication No. 62-273634, recording and/or reproduction of information are performed by scanning the tape with laser light at a predetermined tilt angle with respect to a tape running direction. Thereby, the area of the tape can be maximally utilized, which enables recording and/or reproduction of a large volume of information.

SUMMARY

The present disclosure provides an objective lens capable of suppressing increase in aberration caused by a tilt of an optical component or a light source, and an optical pickup device including the objective lens.

An objective lens according to the present disclosure converges light of a predetermined wavelength $\lambda$ on a recording medium, and satisfies the following condition:

$$|CML|+|CMF| \approx 0.03\lambda$$

where

CML is an amount of a generated third-order coma aberration per 1 degree of tilt of the objective lens, and CMF is an amount of a generated third-order coma aberration per 1 degree of tilt of off-axis light.

Another objective lens according to the present disclosure converges light of a predetermined wavelength $\lambda$ on a recording medium, and satisfies the following condition:

$$|CMD|<0.02\lambda$$

$$0.02\lambda<|CML|<0.2\lambda$$

where

CML is an amount of a generated third-order coma aberration per 1 degree of tilt of the objective lens, and CMD is an amount of a generated third-order coma aberration per 1 degree of tilt of the recording medium.

The objective lens according to the present disclosure can converge light of a used wavelength with a satisfactory aberration on a recording medium.

DETAILED DESCRIPTION

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

Embodiment 1

Configuration of Optical Pickup Device

Figure 1:
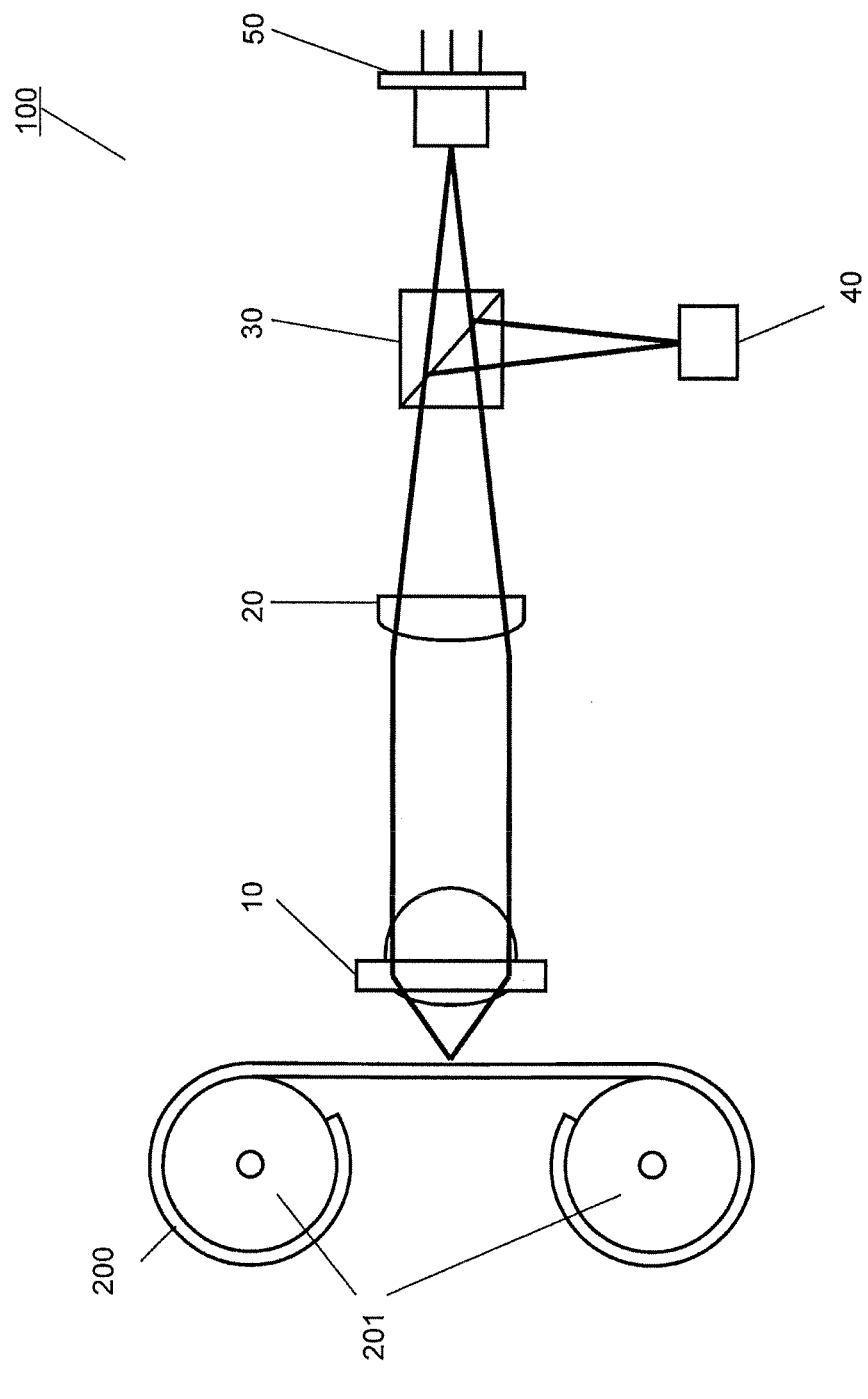
FIG. 1 is a schematic diagram showing a configuration of an optical pickup device.

FIG. 1 is a schematic diagram showing a configuration of an optical pickup device 100. The optical pickup device 100 includes an objective lens 10, a collimator lens 20, a beam splitter 30, a photodetector 40, and a laser light source 50. The optical pickup device 100 performs recording and/or reproduction of information by converging laser light on a predetermined position in an information recording layer of an optical tape 200.

The laser light source 50 emits blue laser light having a wavelength $\lambda$ (380 to 430 nm). The laser light emitted from the laser light source 50 passes through the beam splitter 30, and is converted into substantially parallel light by the collimator lens 20. The laser light having passed through the collimator lens 20 enters the objective lens 10, and is converged on an information recoding surface of the optical tape 200 to form a desired spot thereon. When performing reproduction of the optical tape 200, the laser light reflected by the information recording surface of the optical tape 200 again passes through the objective lens 10, and enters the collimator lens 20. The laser light having passed through the collimator lens 20 is reflected by the beam splitter 30, is converged on the photodetector 40 by a detection lens (not shown), and is detected as an optical signal.

[Configuration of Optical Tape]

The optical tape 200 is an example of an optical information recording medium. As shown in FIG. 1, the optical tape 200 is wound on two reels 201. The optical tape 200 is caused to run by rotating the reels 201.

As a material of the optical tape 200, a resin material having high slidability, such as polyester resin or acrylic resin, is used. The resin material is molded into a thin tape shape by extrusion molding, for example.

Grooves for tracking are formed on the surface of the optical tape 200. The grooves are formed by using a cylindrical stamper. An inverted pattern of a desired groove pattern is formed on the surface of the cylindrical stamper. The stamper is pressed against the tape-shaped material, and the desired groove pattern is transferred to the tape-shaped material. Since the stamper is cylindrical in shape, transfer of the groove pattern can be successively and continuously performed after the resin material has been extruded, resulting in improved efficiency.

A recording layer in which information is recorded is formed on the surface of the optical tape 200. As a material of the recording layer, a phase change material in which atomic bonds are locally changed by the energy of converged light, is adopted. A phase change material is selected depending on the wavelength to be used. For example, when using light of a wavelength about 400 nm, a GeSbTe-based material or a AgInSbTe-based material which is used for BD-RE (Blu-ray (registered trademark) Disc Rewritable) or the like, is adopted. The phase change material is formed in a membrane on the surface of the recording medium by sputtering. The recording layer can be continuously formed on the recording medium by introducing the recording medium in a sputtering device after the extrusion molding and the groove formation.

In order to protect the recording layer and/or improve the slidability, a thin cover layer is provided on the recording layer according to need. That is, the cover layer may be provided or may not be provided on the recording surface of the optical tape 200. When providing the cover layer on the recording surface of the optical tape 200, the cover layer is formed of a material that is permeable to the used wavelength. For example, a UV-curable resin is used. The UV-curable resin is excellent in productivity because application and curing of the UV-curable resin can be performed continuously. The thickness of the cover layer is desirably 10 μm or thinner. By using such a thin cover layer, it is possible to suppress occurrence of an aberration when the optical tape 200 is tilted from an ideal state at the time of recording, reproduction, or erasing. More desirably, the thickness of the cover layer is several tens of nm or thinner. By further reducing the thickness of the cover layer, occurrence of an aberration when the optical tape 200 is tilted from the ideal state at the time of recording, reproduction, or erasing, is significantly suppressed.

[Objective Lens]

The objective lens 10 converges the blue laser light of the wavelength $\lambda$ (380 to 430 nm) on the information recording surface of the optical tape 200 to form a spot thereon. Optically functional surfaces of the objective lens 10 on an incident side and an exit side each consist of an aspheric surface whose center matches the optical axis.

As a material of the objective lens 10, a glass material may be used. By using a glass material, it is possible to suppress variation in performance due to variation in temperature of the optical pickup device 100.

The focal length of the objective lens 10 is desirably 1.3 mm or shorter. Such a short focal length allows reduction in the size of the objective lens 10 itself. As a result, reduction in the size of the optical pickup device 100 including the objective lens 10 is also realized. Further, the focal length of the objective lens 10 is desirably not shorter than 0.65 mm. If the focal length is shorter than 0.65 mm, the working distance between the objective lens 10 and the optical tape 200 becomes too short, which might cause contact of the objective lens 10 with the optical tape 200 during operation. By setting the focal length to 0.65 mm or longer, sufficient working distance can be secured between the objective lens 10 and the optical tape 200, and the possibility of such contact during operation can be reduced.

The numerical aperture of the objective lens 10 is 0.8 or larger. Therefore, the optical pickup device 100 can realize a high recording density. However, generally, when the numerical aperture is increased, a larger third-order coma aberration occurs when the objective lens 10 tilts. So, the objective lens 10 of the present embodiment has the following configuration to realize a satisfactory aberration.

The objective lens 10 of the present embodiment satisfies the following formula (1) when an amount of a generated third-order coma aberration per 1 degree of tilt of the objective lens 10 is CML, and an amount of a generated third-order coma aberration per 1 degree of tilt of off-axis light is CMF.

$$|CML|+|CMF|<0.03\lambda \tag{1}$$

When formula (1) is satisfied, it is possible to suppress aberration of the objective lens 10 of the present embodiment even when the objective lens 10 is tilted or the light source is tilted with respect to the optical axis. As a result, the objective lens 10 can form a desired spot on the information recording surface of the optical tape 200. That is, the objective lens 10 satisfying formula (1) can realize satisfactory performance.

A tilt of the objective lens 10 refers to a state where the optical axis of the objective lens 10 is tilted with respect to a reference optical axis. The reference optical axis refers to an appropriate optical axis in the converging optical system of the optical pickup device 100, i.e., a design optical axis. The reference optical axis may be, for example, a line perpendicular to a lens installation surface of a lens holder that holds the collimator lens 20 or the objective lens 10 at the time of design or assembly.

Further, the "off-axis light" refers to a light beam incident on the objective lens 10, whose optical axis is tilted with respect to the reference optical axis.

When an amount of a generated third-order coma aberration per 1 degree of tilt of the optical tape 200 is CMD, the objective lens 10 of the present embodiment may satisfy the following formula (2):

$$|CML|+|CMF|+|CMD|<0.06\lambda \quad (2)$$

When formula (2) is satisfied, it is possible to suppress the aberration even when the objective lens 10 is tilted, or the light source 50 is tilted with respect to the optical axis. Further, the objective lens 10 of the present embodiment can suppress the aberration even when the optical tape 200 is tilted. As a result, the objective lens 10 can form a desired spot on the information recording surface of the optical tape 200.

The "tilt" of the optical tape 200 means a tilt of the optical tape 200 with respect to a surface perpendicular to the reference optical axis.

The objective lens 10 may be configured so that a wavefront aberration has a minimum value when the tilt of the objective lens 10 is in a range larger than 0 degree and smaller than 1 degree. This configuration suppresses increase in the wavefront aberration when the objective lens 10 is tilted.

The objective lens 10 may be configured so that a third-order spherical aberration or a third-order astigmatism has a minimum value when the tilt of the objective lens 10 is in a range larger than 0 degree and smaller than 1 degree. This configuration reduces the value of the third-order spherical aberration or the third-order astigmatism when the objective lens 10 is tilted.

It is desired that, when the tilt of the objective lens 10 is in a range larger than 0 degree and smaller than 1 degree, the minimum value of the third-order spherical aberration or the third-order astigmatism is equal to or smaller than 1/10 of the value of an on-axis third-order spherical aberration or an on-axis third-order astigmatism. This configuration further reduces the value of the third-order spherical aberration or the third-order astigmatism when the objective lens 10 is tilted.

The objective lens 10 may be configured so that the value of the on-axis third-order spherical aberration or the on-axis third-order astigmatism is equal to or larger than the half of the value of an on-axis wavefront aberration. This configuration reduces the value of the third-order spherical aberration or the third-order astigmatism when the objective lens is tilted.

Generally, a conventional optical recording/reproduction device records and reproduces information on and from a disk-shaped medium such as a compact disc, a video disc, or a magneto-optical disk. In such a recording/reproduction device, since the diameter of a light spot is narrowed to about a diffraction limit, further improvement in recording density cannot be expected. In recent years, research and development have been actively carried out concerning the standard of a high-density optical disc (Blu-Ray Disc (registered trademark), hereinafter referred to as "BD") that has an increased storage capacity by increasing the recording density of the optical disc using blue laser light having a wavelength of about 400 nm. However, it is difficult to further reduce the wavelength because of limitations on materials to be used.

While the storage capacity of the optical information recording medium depends on the recording area, the disk-shaped recording medium is limited in size, and thereby the storage capacity is limited. Therefore, it has been proposed to use a tape-shaped recording medium having a larger recording area, as a larger capacity medium.

When performing recording/reproduction or erasing on such a tape-shaped recording medium, light of a desired wavelength needs to be converged on the recording layer of the recording medium to form a desired spot thereon. In order to form such a desired spot, the aberration on the recording layer needs to be satisfactory.

However, an aberration occurs if an optical component or a light source is tilted or deviated from its ideal state. Further, even when the optical component or the light source is located in its ideal state, an aberration might be caused by a molding error of the objective lens. If a large aberration occurs, sufficient performance to perform recording/reproduction or erasing on the recording medium cannot be obtained.

In the conventional optical pickup device for optical discs, an operation to compensate an aberration caused by a tilt or deviation of an optical component or a light source with respect to its ideal state is performed simultaneously with recording/reproduction or erasing of information on an optical disc. In this case, however, an additional mechanism is needed in order to compensate the aberration while performing recording, reproduction, or erasing on the optical disc, which causes increase in cost and power consumption.

By using the objective lens according to the present disclosure, it is possible to suppress increase in the aberration caused by a tilt of an optical component or a light source, without using an additional mechanism. Further, it is possible to realize an objective lens that suppresses increase in the aberration caused by an error in molding the objective lens. Furthermore, by using the objective lens according to the present disclosure, it is possible to realize an optical pickup device in which aberrations are satisfactorily reduced.

Embodiment 2

Hereinafter, an objective lens 10 according to Embodiment 2 will be described.

The objective lens 10 of the present embodiment satisfies the following formulae (3) and (4) when an amount of a generated third-order coma aberration per 1 degree of tilt of the objective lens 10 is CML, and an amount of a generated third-order coma aberration per 1 degree of tilt of the optical tape 200 is CMD.

$$|CMD|<0.02\lambda \quad (3)$$

$$0.02\lambda<|CML|<0.2\lambda \quad (4)$$

When formulae (3) and (4) are satisfied, a third-order coma aberration which occurs when a symmetry axis of an aspheric configuration of one surface of the objective lens 10 is tilted with respect to a symmetry axis of the other surface, can be compensated by tilting the entirety of the objective lens 10.

It is desirable that the value of |CML| does not exceed 0.2λ. If the value of |CML| exceeds 0.2λ, the range of the tilt angle of the objective lens 10, which is within the Marechal criterion (wavefront aberration<0.07λ) when the objective lens 10 is tilted, is abruptly narrowed.

Further, as in Embodiment 1, the objective lens 10 may be configured so that the wavefront aberration has a minimum value when the tilt of the objective lens 10 is in a range larger than 0 degree and smaller than 1 degree. This configuration suppresses increase in the wavefront aberration when the objective lens 10 is tilted.

Further, as in Embodiment 1, the objective lens 10 may be configured so that the third-order spherical aberration or the third-order astigmatism has a minimum value when the tilt of the objective lens 10 is in a range larger than 0 degree and smaller than 1 degree. This configuration reduces the value of the third-order spherical aberration or the third-order astigmatism when the objective lens 10 is tilted.

Further, as in Embodiment 1, it is desirable that, when the tilt of the objective lens 10 is in a range larger than 0 degree and smaller than 1 degree, the minimum value of the third-order spherical aberration or the third-order astigmatism is equal to or smaller than 1/10 of the value of the on-axis third-order spherical aberration or the on-axis third-order astigmatism. This configuration further reduces the value of the third-order spherical aberration or the third-order astigmatism when the objective lens 10 is tilted.

Further, as in Embodiment 1, the objective lens 10 may be configured so that the value of the on-axis third-order spherical aberration or the on-axis third-order astigmatism is equal to or larger than the half of the value of the on-axis wavefront aberration. This configuration reduces the value of the third-order spherical aberration or the third-order astigmatism when the objective lens 10 is tilted.

Other Embodiments

In the above embodiments, a case where one optical pickup device is used has been described. However, the present disclosure is not limited thereto. A plurality of optical pickups arranged in an array may be used for one recording medium.

In the above embodiments, a configuration has been described in which one objective lens is provided in one optical pickup device. However, the present disclosure is not limited thereto. A plurality of objective lenses may be provided in one optical pickup.

In the above embodiments, a laser light source that emits blue laser light having a wavelength of 380 to 430 nm has been described. However, the present disclosure is not limited thereto. For example, a laser light source used for DVD or a laser light source used for CD may be used. Alternatively, a laser light source which emits ultraviolet light having a wavelength shorter than that of blue laser light may be used. By using such a light source having the shorter wavelength, the size of a convergence spot is further reduced, resulting in increased recording density.

Further, recording, reproduction, erasing or the like of information may be performed by using an immersion lens filled with a liquid material, which is provided between the objective lens and the recording medium. Thereby, it is possible to design the objective lens with a larger numerical aperture.

Further, materials of the optical components constituting the optical system, such as the collimator lens and the objective lens, may be any material having permeability to the used wavelength, such as glass, resin, ceramic, and the like.

Further, the surfaces of the collimator lens and the objective lens may be spherical, aspherical, or diffractive in shape. A diffractive surface may be formed over the entirety of the surface of the objective lens, or on a part of the surface of the objective lens. The surface of the objective lens may be divided into two or more regions.

Further, the recording layer of the recording medium is not limited to a single layer, but may have a multilayer configuration consisting of a plurality of recording layers. Further, recording layers may be formed on the both surfaces of the recording medium.

Further, the recording medium is not limited to the tape-shaped recording medium. The recording medium may be a disc-shaped medium such as an optical disc, or a sheet-shaped medium. Further, the recording medium may be a cylindrical drum-shaped medium having a recording layer formed on its surface or inner circumferential surface.

When a cover layer is provided on the recording medium, the material of the cover layer is not limited to resin. Since any material permeable to the used wavelength can be used, the material of the cover layer may be glass. Alternatively, the material of the cover layer may be a metal such as aluminum or silver. When using a metal, the metal is thinly deposited by sputtering or the like so that the cover layer is permeable to the used wavelength. Alternatively, an inorganic compound such as $MgF_2$ or $SiO_2$, which is used for an anti-reflection film of an optical component, may be used. By forming an inorganic compound with an appropriate thickness, reflected light from the surface of the cover layer can be suppressed.

EXAMPLES

Hereinafter, specific examples of objective lenses will be described. An aspheric configuration of an objective lens according to each of Examples described later is represented by the following formula (5).

$$X = \frac{Ch^2}{1 + \sqrt{1 - (1+k)C^2h^2}} + \sum A_n h^n \qquad (5)$$

where

X is a distance from an on-aspheric-surface point at a height h relative to the optical axis, to a tangential plane at the top of the aspheric surface, h is the height relative to the optical axis, C is the curvature at the top of an aspheric surface (C=1/RD), k is the conic constant of the surface, and An is the nth-order aspheric constant of the surface.

Example 1

In an objective lens according to Example 1, both the first surface and the second surface are aspheric surfaces. The objective lens of the present example is an objective lens which preforms recording and/or reproduction of information on a recording layer provided at the uppermost surface of an optical information recording medium, by using blue laser light having a wavelength of 408 nm.

Table 1 shows construction data of the objective lens according to Example 1.

TABLE 1

| | |
|---|---|
| Wavelength [μm] | 0.408 |
| Diameter [mm] | 2.236 |
| Thickness of center portion of lens [mm] | 1.918265 |
| Working distance [mm] | 0.3 |
| Focal length [mm] | 1.3 |
| Magnification | 0 |

TABLE 1-continued

| | |
|---|---|
| Refractive index of lens | 1.623409 |
| Numerical aperture at the image side | 0.86 |

| | Coefficient |
|---|---|
| First surface | |
| RD | 0.9579416 |
| k | −0.6144463 |
| A2 | 0 |
| A4 | 0.027444249 |
| A6 | −0.013654699 |
| A8 | 0.081763601 |
| A10 | −0.13850559 |
| A12 | 0.094480637 |
| A14 | 0.035704966 |
| A16 | −0.032447502 |
| A18 | −0.11863213 |
| A20 | 0.13877445 |
| A22 | −0.010225368 |
| A24 | −0.044387263 |
| A26 | 0.005336783 |
| A28 | 0.01384983 |
| A30 | −0.004954273 |
| Second surface | |
| RD | −1.215463 |
| k | −54.37407 |
| A2 | 0 |
| A4 | 0.85846559 |
| A6 | −5.8573865 |
| A8 | 22.286476 |
| A10 | −54.917649 |
| A12 | 79.759701 |
| A14 | −55.834595 |
| A16 | 9.5446645 |

Figure 2:
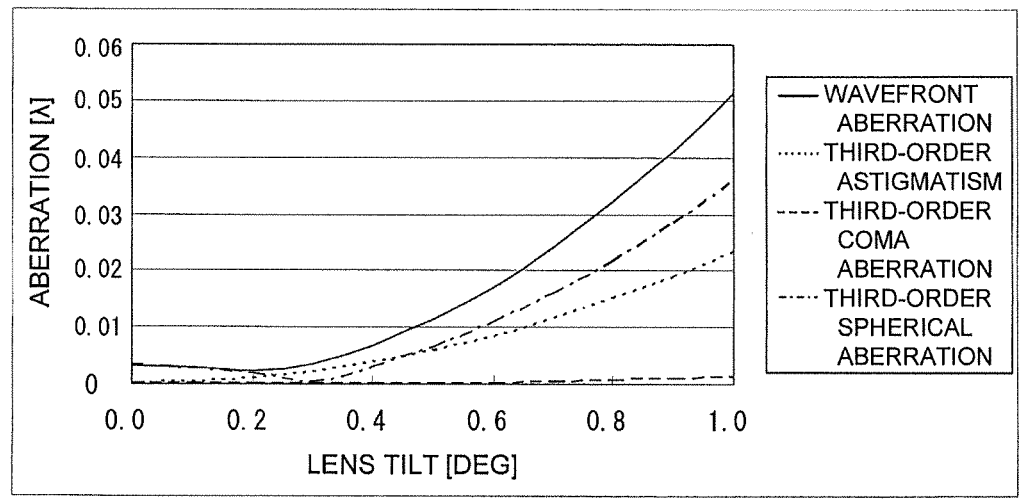
FIG. 2 is a graph showing the characteristics of an objective lens according to Example 1.

FIG. 2 shows the characteristics of the objective lens of Example 1 obtained when the objective lens is tilted with respect to the reference optical axis (hereinafter referred to as "lens tilt characteristics").

As shown in FIG. 2, even when the objective lens is tilted at 1 degree with respect to the reference optical axis, the value of wavefront aberration is smaller than the Marechal criterion (wavefront aberration<0.07λ). Therefore, the objective lens satisfies the imaging performance required of an objective lens for use in an optical pickup.

Further, when performing recording and/or reproduction on a recording layer at the uppermost surface of a recording medium such as an optical tape, an aberration caused by a tilt of the recording medium is zero. In this case, since the tilt of the recording medium need not be considered, the value of an aberration caused by a tilt of the objective lens with respect to the optical axis of the optical pickup is equal to the value of an aberration caused by a tilt of the light source with respect to the optical axis of the objective lens. That is, the objective lens satisfies the imaging performance even when incident light obliquely enters the objective lens. In the case of Example 1, even when incident light enters at a tilt of 1 degree, the value of the wavefront aberration is smaller than the Marechal criterion. Therefore, the objective lens satisfies the imaging performance required of an optical pickup lens.

Both the amount of a generated third-order coma aberration per 1 degree of tilt of the objective lens (CML) and the amount of a generated third-order coma aberration per 1 degree of tilt of the off-axis light (CMF) are 0.0012λ. Accordingly, the objective lens of Example 1 satisfies formula (1).

In addition, since recording and/or reproduction of information are performed on the recording layer at the uppermost surface of the recording medium, even when the recording medium is tilted, no third-order coma aberration occurs. That is, the amount of a generated third-order coma aberration (CMD) per 1 degree of tilt of the recording medium is zero. Accordingly, the objective lens of Example 1 satisfies formula (2).

Accordingly, the objective lens of Example 1 can realize excellent performance. In an optical pickup for BD, it is needed to compensate an aberration caused by a tilt of a recording medium by tilting an objective lens or the pickup device. However, the objective lens of Example 1 need not perform such an operation because no aberration is caused by a tilt of the recording medium.

By using the objective lens of Example 1, it is possible to realize an optical pickup device in which occurrence of an aberration is suppressed with respect to a tilt of the recording medium, a tilt of the objective lens when it is installed, a tilt of incident light, and a tilt of the optical pickup device itself.

Example 2

When an objective lens as described in Example 1 is formed by molding, a symmetry axis of an aspheric configuration of one surface of the objective lens might be tilted with respect to a symmetry axis of the other surface due to a tilt of a mold or the like (hereinafter, this tilt is referred to as "surface tilt"). Such a surface tilt mainly causes a large third-order coma aberration.

Figure 3:
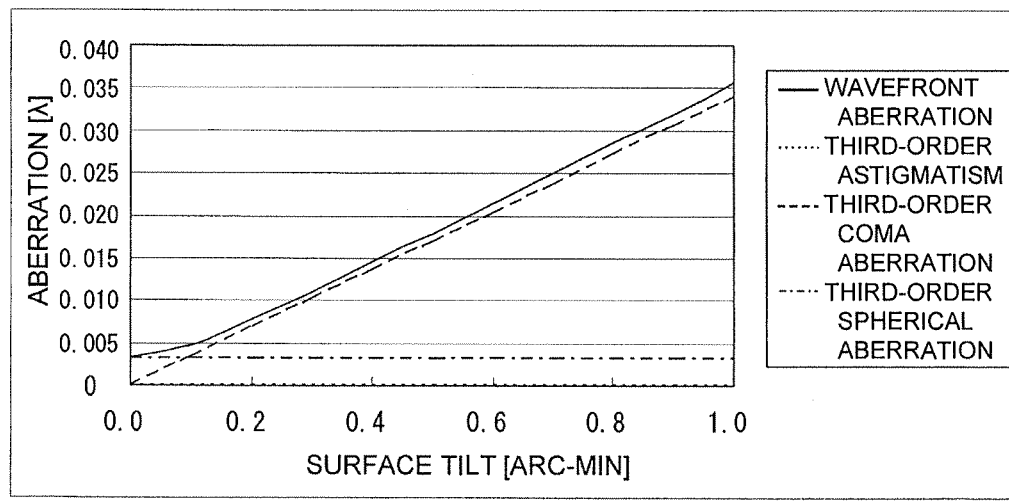
FIG. 3 is a graph showing the characteristics of the objective lens according to Example 1.

FIG. 3 shows surface tilt characteristics of the objective lens according to Example 1.

As shown in FIG. 3, a surface tilt of 1 arc-minute (1 arc-minute=1/60 degree) causes a third-order coma aberration of about 0.035λ. Thus, a slight surface tilt significantly deteriorates the aberration. However, the third-order coma aberration that occurs when the objective lens of Example 1 is tilted is very small as described above. In addition, the third-order coma aberration that occurs when the recording medium is tilted is very small. That is, since there is no method for compensating a third-order coma aberration caused by a surface tilt, conditions required for lens molding become strict. Therefore, the objective lens according to Example 2 is designed as follows.

Table 2 shows construction data of the objective lens according to Example 2. In the objective lens of Example 2, both the first surface and the second surface are aspheric surfaces. The objective lens of Example 2 is an objective lens which preforms recording and/or reproduction of information on a recording layer provided at the uppermost surface of an optical information recording medium, by using blue laser light having a wavelength of 408 nm.

TABLE 2

| | |
|---|---|
| Wavelength [μm] | 0.408 |
| Diameter [mm] | 2.236 |
| Thickness of center portion of lens [mm] | 1.92573 |
| Working distance [mm] | 0.3 |
| Focal length [mm] | 1.3 |
| Magnification | 0 |
| Refractive index of lens | 1.623409 |
| Numerical aperture at the image side | 0.86 |

| | Coefficient |
|---|---|
| First surface | |
| RD | 0.9617137 |
| k | −0.622778 |
| A2 | 0 |
| A4 | 0.029895665 |
| A6 | −0.016404821 |
| A8 | 0.085638711 |
| A10 | −0.14442465 |

TABLE 2-continued

| | |
|---|---|
| A12 | 0.10060327 |
| A14 | 0.033332485 |
| A16 | −0.036170421 |
| A18 | −0.11924289 |
| A20 | 0.1414299 |
| A22 | −0.007723625 |
| A24 | −0.043176052 |
| A26 | 0.002408979 |
| A28 | 0.012023827 |
| A30 | −0.00331681 |
| Second surface | |
| RD | −1.191761 |
| k | −59.84114 |
| A2 | 0 |
| A4 | 0.6894962 |
| A6 | −5.1761604 |
| A8 | 21.181007 |
| A10 | −41.978503 |
| A12 | −60.111815 |
| A14 | 540.10447 |
| A16 | −1125.6375 |
| A18 | 808.96831 |
| A20 | 19.114693 |

Figure 4:
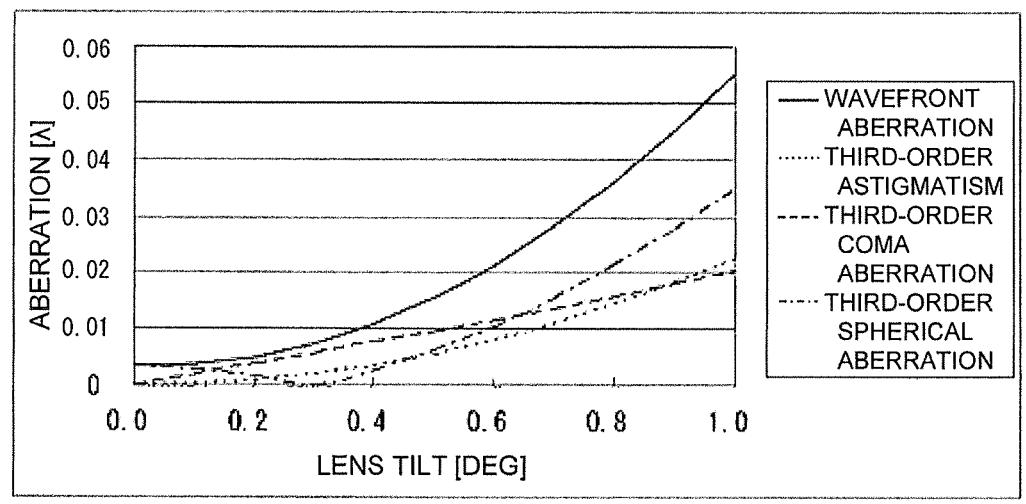
FIG. 4 is a graph showing the characteristics of an objective lens according to Example 2.

FIG. 4 shows lens tilt characteristics of the objective lens of Example 2.

As shown in FIG. 4, the objective lens of Example 2 is designed so that a third-order coma aberration occurs when the objective lens is tilted. Thereby, a coma aberration caused by a surface tilt is offset by a coma aberration caused by a tilt of the objective lens, and consequently, increase in the wavefront aberration can be suppressed.

When performing recording and/or reproduction on a recording layer at the uppermost surface of a recording medium such as an optical tape, an aberration caused by a tilt of the recording medium is zero. Since the tilt of the recording medium need not be considered, the value of an aberration caused by a tilt of the objective lens with respect to the optical axis of the optical pickup is equal to the value of an aberration caused by a tilt of the light source with respect to the optical axis of the objective lens. Therefore, both the amount of a generated third-order coma aberration per 1 degree of tilt of the objective lens (CML) and the amount of a generated third-order coma aberration per 1 degree of tilt of the off-axis light (CMF) are 0.0203λ. Further, since recording and/or reproduction of information are performed on the recording layer at the uppermost surface of the recording medium, even if the recording medium is tilted, no third-order coma aberration occurs. That is, the amount of a generated third-order coma aberration per 1 degree of tilt of the recording medium (CMD) is zero. Accordingly, the objective lens of Example 2 satisfies formulae (3) and (4).

Figure 5:
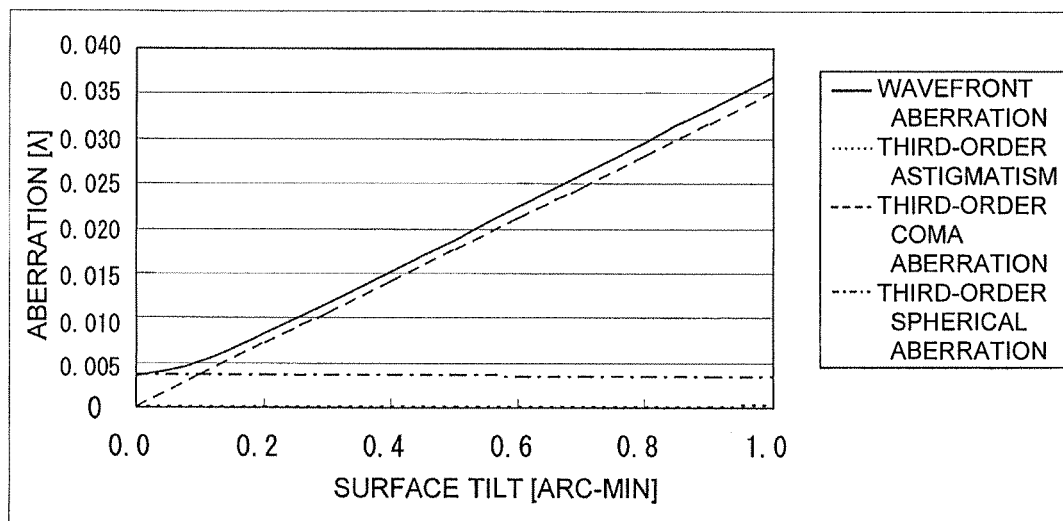
FIG. 5 is a graph showing the characteristics of the objective lens according to Example 2.

FIG. 5 shows surface tilt characteristics of the objective lens according to Example 2.

As shown in FIG. 5, if a surface tilt of 0.5 arc-minute occurs in the objective lens of Example 2, the wavefront aberration is about 0.0187λ, and the third-order coma aberration is about 0.0175λ.

Figure 6:
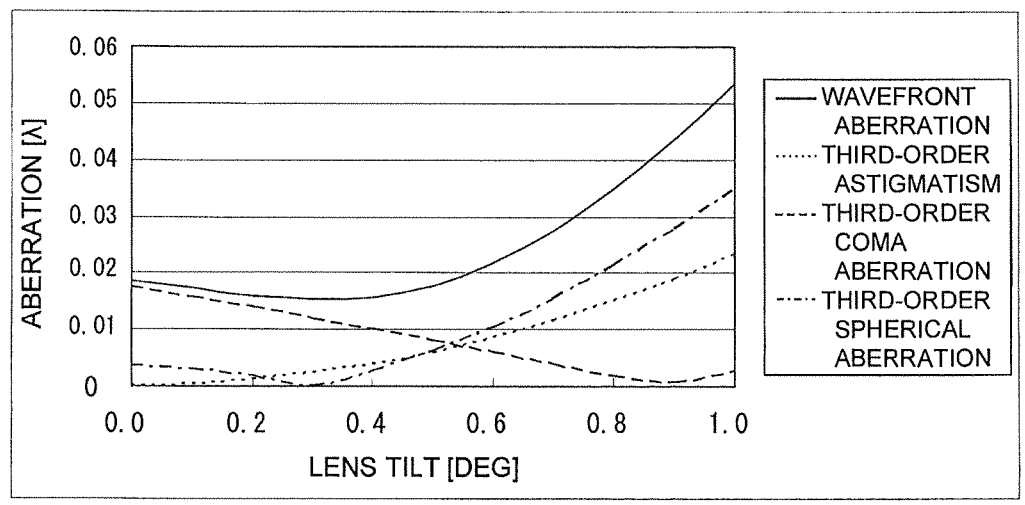
FIG. 6 is a graph showing the characteristics of the objective lens according to Example 2.

FIG. 6 shows the values of aberrations obtained when the objective lens of Example 2 is tilted so as to offset the third-order coma aberration caused by the surface tilt of 0.5 arc-minute.

As shown in FIG. 6, the third-order coma aberration can be made substantially zero by tilting the objective lens at 0.9 degree. At this time, the third-order coma aberration is 0.0005λ, which is smaller than 1/30 of the value, 0.0175λ, of the third-order coma aberration in the state where the objective lens is not tilted. Thus, the third-order coma aberration is compensated. Further, the wavefront aberration is minimized to about 0.0153λ by tilting the objective lens at 0.4 degree, and thus the wavefront aberration is improved.

Thus, it is possible to realize an objective lens which can suppress increase in the aberration by tilting the objective lens even when a surface tilt occurs due to a molding error of the objective lens.

Example 3

In an objective lens according to Example 3, both the first surface and the second surface are aspheric surfaces. The objective lens of the present example is an objective lens which preforms recording and/or reproduction of information on a recording layer provided at the uppermost surface of an optical information recording medium, by using blue laser light having a wavelength of 408 nm.

Table 3 shows construction data of the objective lens according to Example 3.

TABLE 3

| | |
|---|---|
| Wavelength [μm] | 0.408 |
| Diameter [mm] | 2.236 |
| Thickness of center portion of lens [mm] | 1.952503 |
| Working distance [mm] | 0.3 |
| Focal length [mm] | 1.3 |
| Magnification | 0 |
| Refractive index of lens | 1.623409 |
| Numerical aperture at the image side | 0.86 |
| | Coefficient |
| First surface | |
| RD | 0.9758931 |
| k | −0.6305822 |
| A2 | 0 |
| A4 | 0.030186341 |
| A6 | −0.22307269 |
| A8 | 0.088410535 |
| A10 | −0.14560835 |
| A12 | 0.10023653 |
| A14 | 0.035372313 |
| A16 | −0.035535555 |
| A18 | −0.12219931 |
| A20 | 0.13979977 |
| A22 | −0.008156001 |
| A24 | −0.04143358 |
| A26 | 0.003351605 |
| A28 | 0.011803871 |
| A30 | −0.003751354 |
| Second surface | |
| RD | −1.108048 |
| k | −41.73717 |
| A2 | 0 |
| A4 | 0.76972741 |
| A6 | −5.4790561 |
| A8 | 18.302733 |
| A10 | −23.167727 |
| A12 | −84.645065 |
| A14 | 500.77684 |
| A16 | −1139.611 |
| A18 | 1242.2161 |
| A20 | −501.99529 |
| A22 | 340.13811 |
| A24 | −1060.7612 |
| A26 | 731.72749 |

Figure 7:
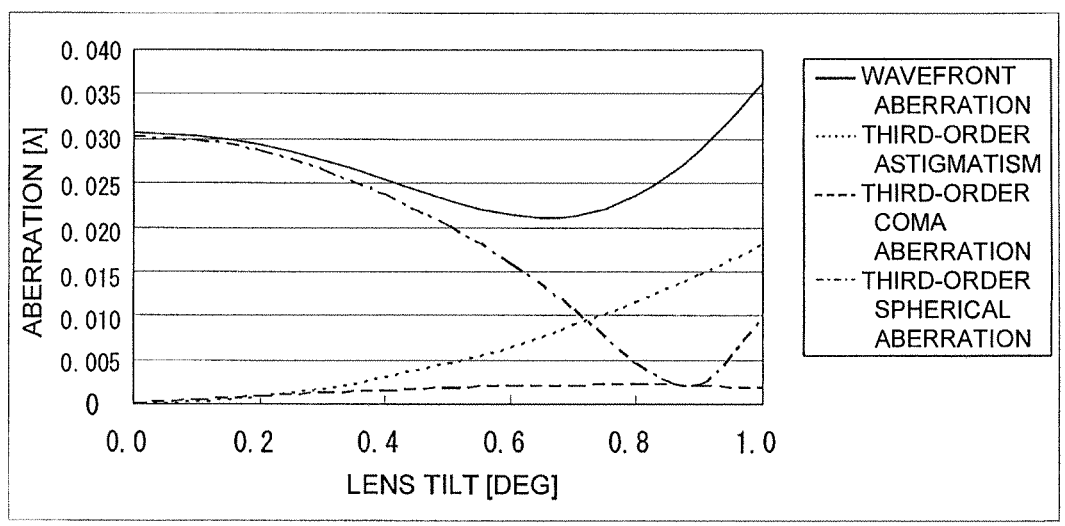
FIG. 7 is a graph showing the characteristics of an objective lens according to Example 3.

FIG. 7 shows lens tilt characteristics of the objective lens according to Example 3.

As shown in FIG. 7, even when the objective lens is tilted at 1 degree with respect to the reference optical axis, the value of the wavefront aberration is smaller than the Marechal criterion (wavefront aberration<0.07λ). Therefore, the objective lens satisfies the imaging performance required of an optical pickup lens.

Further, when performing recording and/or reproduction on a recording layer at the uppermost surface of a recording medium such as an optical tape, an aberration caused by a tilt of the recording medium is zero. Since the tilt of the recording medium need not be considered, the value of an aberration caused by a tilt of the objective lens with respect to the optical axis of the optical pickup is equal to the value of an aberration caused by a tilt of the light source with respect to the optical axis of the objective lens. That is, the objective lens satisfies the imaging performance even when incident light obliquely enters the objective lens. In the case of Example 3, even when incident light enters at a tilt of 1 degree, the value of the wavefront aberration is smaller than the Marechal criterion. Therefore, the objective lens satisfies the imaging performance required of an optical pickup lens.

At this time, both the amount of a generated third-order coma aberration per 1 degree of tilt of the objective lens (CML) and the amount of a generated third-order coma aberration per 1 degree of tilt of the off-axis light (CMF) are 0.0018λ. That is, the objective lens of Example 3 satisfies formula (1).

Further, the amount of a generated third-order coma aberration per 1 degree of tilt of the recording medium (CMD) is zero. That is, the objective lens of Example 3 satisfies formula (2).

When the objective lens of the present example is tilted at 0.7 degree, the wavefront aberration has a minimum value, which is about 0.0213λ.

When the objective lens of the present example is tilted at 0.9 degree, the third-order spherical aberration has a minimum value, which is about 0.0021λ. The value, about 0.0021λ, of the third-order spherical aberration obtained when the objective lens of the present example is tilted at 0.9 degree is smaller than 1/10 of the value, about 0.0301λ, of the on-axis third-order spherical aberration obtained when the objective lens is not tilted.

When the objective lens of the present example is not tilted with respect to the optical axis, the wavefront aberration is 0.0308λ, and the third-order spherical aberration is 0.0301λ. That is, the third-order spherical aberration is larger than the half of the wavefront aberration.

The aberration due to a tilt of the recording medium is zero. Therefore, in contrast to the optical pickup device for BD, it is not needed to compensate an aberration caused by a tilt of the recording medium by tilting the objective lens or the entirety of the pickup device.

As described above, by using the objective lens of the present example, it is possible to realize an optical pickup device in which occurrence of an aberration is suppressed with respect to a tilt of the recording medium, a tilt of the objective lens when it is installed, a tilt of incident light, and a tilt of the optical pickup device itself.

Example 4

An objective lens according to Example 4 performs recording and/or reproduction of information on a recording layer at the uppermost surface of an optical information recording medium, by using blue laser light having a wavelength of 408 nm. The first surface of the objective lens of the present example is an aspheric surface. The second surface of the objective lens of the present example is an aspheric surface to which a configuration represented by the following formula (6) is added.

$$-0000.5 \times \sqrt{6} \sin 2\theta \times R^2 \qquad (6)$$

where $R, \theta$ are coordinates on a rotary symmetric aspheric surface of the second surface in a polar coordinate system $(R, \theta)$ whose center matches a center axis of the rotary symmetric aspheric surface.

Table 4 shows construction data of the objective lens according to Example 4.

TABLE 4

| Wavelength [μm] | 0.408 |
| --- | --- |
| Diameter [mm] | 2.236 |
| Thickness of center portion of lens [mm] | 1.909999 |
| Working distance [mm] | 0.3 |
| Focal length [mm] | 1.3 |
| Magnification | 0 |
| Refractive index of lens | 1.623409 |
| Numerical aperture at the image side | 0.86 |

| | Coefficient |
| --- | --- |
| First surface | |
| RD | 0.9551726 |
| k | −0.5800956 |
| A2 | 0 |
| A4 | 0.22996291 |
| A6 | −0.015694857 |
| A8 | 0.079944754 |
| A10 | −0.13704663 |
| A12 | 0.097249185 |
| A14 | 0.031852334 |
| A16 | −0.037901074 |
| A18 | −0.11620545 |
| A20 | 0.15375107 |
| A22 | −0.021478207 |
| A24 | −0.047692372 |
| A26 | 0.006446607 |
| A28 | 0.016822459 |
| A30 | −0.005980946 |
| Second surface | |
| RD | −1.23615 |
| k | −58.55167 |
| A2 | 0 |
| A4 | 0.76891485 |
| A6 | −4.4006601 |
| A8 | 11.926739 |
| A10 | −17.386088 |
| A12 | 10.646926 |

Figure 8:
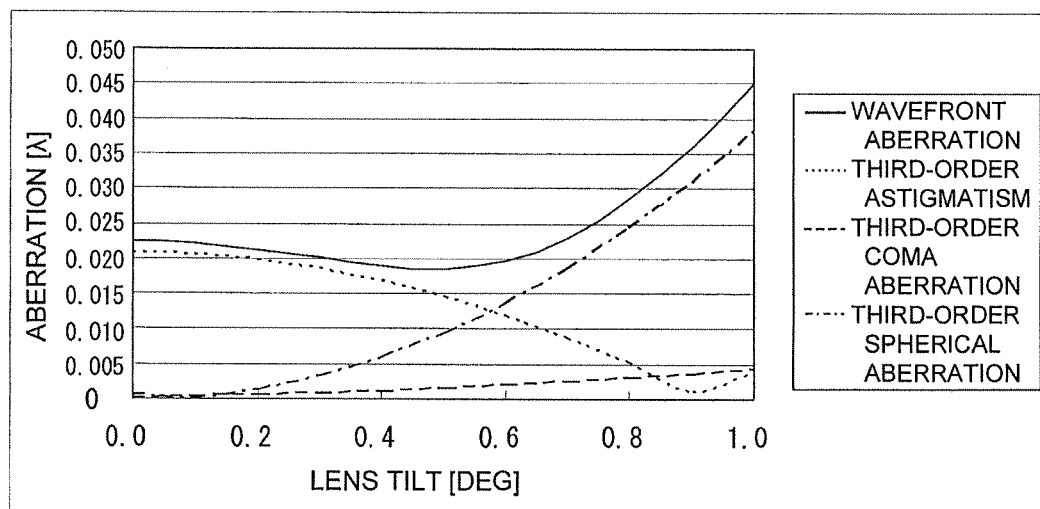
FIG. 8 is a graph showing the characteristics of an objective lens according to Example 4.

FIG. 8 shows lens tilt characteristics of the objective lens according to Example 4.

As shown in FIG. 8, even when the objective lens is tilted at 1 degree with respect to the reference optical axis, the value of the wavefront aberration is smaller than the Marechal criterion (wavefront aberration<0.07λ). Therefore, the objective lens satisfies the imaging performance required of an optical pickup lens.

Further, when performing recording and/or reproduction on a recording layer at the uppermost surface of a recording medium such as an optical tape, an aberration caused by a tilt of the recording medium is zero. Since the tilt of the recording medium need not be considered, the value of an aberration caused by a tilt of the objective lens with respect to the optical axis of the optical pickup is equal to the value of an aberration caused by a tilt of the light source with respect to the optical axis of the objective lens. That is, the objective lens satisfies the imaging performance even when incident light obliquely enters the objective lens. In the case of the present example, even when incident light enters at a tilt of 1 degree, the value of the wavefront aberration is smaller than the Marechal criterion. Therefore, the objective lens satisfies the imaging performance required of an optical pickup lens.

At this time, both the amount of a generated third-order coma aberration per 1 degree of tilt of the objective lens (CML) and the amount of a generated third-order coma aberration per 1 degree of tilt of the off-axis light (CMF) are 0.0042λ. That is, the objective lens of Example 4 satisfies formula (1).

Further, the amount of a generated third-order coma aberration per 1 degree of tilt of the recording medium (CMD) is zero. That is, the objective lens of Example 4 satisfies formula (2).

When the objective lens of the present example is tilted at 0.5 degree, the wavefront aberration has a minimum value, which is about 0.0185λ.

When the objective lens of the present example is tilted at 0.9 degree, the third-order astigmatism has a minimum value, which is about 0.0009λ. The value, about 0.0009λ, of the third-order astigmatism obtained when the objective lens of the present example is tilted at 0.9 degree is smaller than 1/10 of the value, about 0.0207λ, of the on-axis third-order astigmatism obtained when the objective lens is not tilted.

When the objective lens of the present example is not tilted with respect to the optical axis, the third-order astigmatism is 0.0207λ while the wavefront aberration is 0.0224λ. The third-order astigmatism is larger than the half of the wavefront aberration.

In an optical pickup for BD, it is needed to compensate an aberration caused by a tilt of a recording medium by tilting an objective lens or the pickup device. However, the objective lens of Example 4 need not perform such an operation because no aberration is caused by a tilt of the recording medium.

By using the objective lens of the present example, it is possible to realize an optical pickup device in which occurrence of an aberration is suppressed with respect to a tilt of the recording medium, a tilt of the objective lens when it is installed, a tilt of incident light, and a tilt of the optical pickup device itself.

Example 5

An objective lens according to Example 5 is an objective lens which performs recording and/or reproduction of information on a recording layer at the uppermost surface of an optical information recording medium by using blue laser light having a wavelength of 408 nm.

The first surface of the objective lens of the present example has an aspheric configuration. The second surface of the objective lens of the present example has an aspheric configuration to which a configuration represented by the following formula (7) is added.

$$-0.00004 \times \sqrt{6} \sin 2\theta \times R^2 \quad (7)$$

where

R, θ are coordinates on a rotary symmetric aspheric surface of the second surface in a polar coordinate system (R, θ) whose center matches a center axis of the rotary symmetric aspheric surface.

Table 5 shows construction data of the objective lens according to Example 5.

TABLE 5

| Wavelength [μm] | 0.408 |
|---|---|
| Diameter [mm] | 2.236 |
| Thickness of center portion of lens [mm] | 1.918071 |
| Working distance [mm] | 0.3 |
| Focal length [mm] | 1.3 |
| Magnification | 0 |
| Refractive index of lens | 1.623409 |
| Numerical aperture at the image side | 0.86 |

| | Coefficient |
|---|---|
| First surface | |
| RD | 0.958386 |
| k | −0.5836004 |
| A2 | 0 |
| A4 | 0.025128954 |
| A6 | −0.020259669 |
| A8 | 0.083293016 |
| A10 | −0.13674926 |
| A12 | 0.095855134 |
| A14 | 0.031985901 |
| A16 | −0.037655929 |
| A18 | −0.11640018 |
| A20 | 0.15346203 |
| A22 | −0.021496892 |
| A24 | −0.047744272 |
| A26 | 0.006784817 |
| A28 | 0.017431962 |
| A30 | −0.006538091 |
| Second surface | |
| RD | −1.212921 |
| k | −55.66099 |
| A2 | 0 |
| A4 | 0.75905516 |
| A6 | −4.4269137 |
| A8 | 12.377406 |
| A10 | −18.927037 |
| A12 | 12.193796 |

Figure 9:
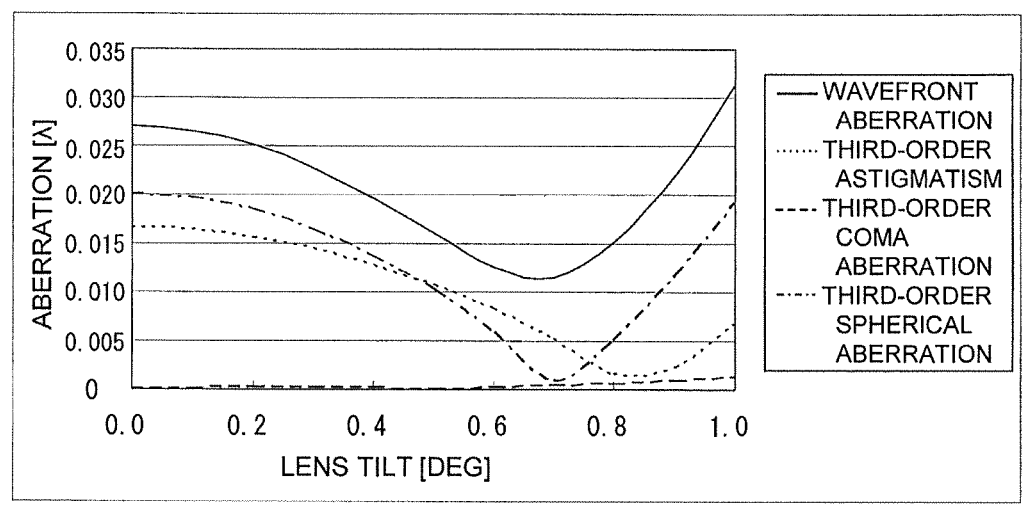
FIG. 9 is a graph showing the characteristics of an objective lens according to Example 5.

FIG. 9 shows lens tilt characteristics of the objective lens of Example 5.

As shown in FIG. 9, even when the objective lens is tilted at 1 degree with respect to the reference optical axis, the value of the wavefront aberration is smaller than the Marechal criterion (wavefront aberration<0.07λ). Therefore, the objective lens satisfies the imaging performance required of an optical pickup lens.

Further, when performing recording and/or reproduction on a recording layer at the uppermost surface of a recording medium such as an optical tape, an aberration caused by a tilt of the recording medium is zero. Since the tilt of the recording medium need not be considered, the value of an aberration caused by a tilt of the objective lens with respect to the optical axis of the optical pickup is equal to the value of an aberration caused by a tilt of the light source with respect to the optical axis of the objective lens. That is, the objective lens satisfies the imaging performance even when incident light obliquely enters the objective lens. In the case of the present example, even when incident light enters at a tilt of 1 degree, the value of the wavefront aberration is smaller than the Marechal criterion. Therefore, the objective lens satisfies the imaging performance required of an optical pickup lens.

At this time, both the amount of a generated third-order coma aberration per 1 degree of tilt of the objective lens (CML) and the amount of a generated third-order coma aberration per 1 degree of tilt of the off-axis light (CMF) are 0.0012λ. Accordingly, the objective lens of the present example satisfies formula (1).

Further, the amount of a generated third-order coma aberration per 1 degree of tilt of the recording medium (CMD) is zero. Accordingly, the objective lens of the present example satisfies formula (2).

When the objective lens of the present example is tilted at 0.7 degree, the wavefront aberration has a minimum value, which is about 0.0116λ.

When the objective lens of the present example is tilted at 0.7 degree, the third-order spherical aberration has a minimum value, which is about 0.0008λ. The value, about 0.0008λ, of the third-order spherical aberration obtained when the objective lens of the present example is tilted at 0.7 degree is smaller than 1/10 of the value, about 0.0200λ, of the on-axis third-order spherical aberration obtained when the objective lens is not tilted.

When the objective lens of the present example is tilted at 0.8 degree, the third-order astigmatism has a minimum value, which is about 0.0016λ. The value, about 0.0016λ, of the third-order astigmatism obtained when the objective lens of the present example is tilted at 0.8 degree is smaller than 1/10 of the value, about 0.0166λ, of the on-axis third-order astigmatism obtained when the objective lens is not tilted.

When the objective lens of the present example is not tilted with respect to the optical axis, the third-order spherical aberration is 0.0200λ while the wavefront aberration is 0.0270λ. The value of the third-order spherical aberration is larger than the half of the value of the wavefront aberration.

When the objective lens of the present example is not tilted with respect to the optical axis, the third-order astigmatism is 0.0166λ while the wavefront aberration is 0.0270λ. The value of the third-order astigmatism is larger than the half of the value of the wavefront aberration.

In an optical pickup for BD, it is needed to compensate an aberration caused by a tilt of a recording medium by tilting an objective lens or the pickup device. However, the objective lens of Example 4 need not perform such an operation because no aberration is caused by a tilt of the recording medium.

By using the objective lens of the present example, it is possible to realize an optical pickup device in which occurrence of an aberration is suppressed with respect to a tilt of the recording medium, a tilt of the objective lens when it is installed, a tilt of incident light, and a tilt of the optical pickup device itself.

Example 6

In an objective lens according to Example 6, both the first surface and the second surface are aspheric surfaces. The objective lens of the present example performs recording and/or reproduction of information on a recording layer at the uppermost surface of an optical information recording medium, by using blue laser light having a wavelength of 408 nm.

Table 6 shows construction data of the objective lens according to Example 6.

TABLE 6

| | |
|---|---|
| Wavelength [μm] | 0.408 |
| Diameter [mm] | 2.236 |
| Thickness of center portion of lens [mm] | 1.919973 |
| Working distance [mm] | 0.3 |
| Focal length [mm] | 1.3 |
| Magnification | 0 |
| Refractive index of lens | 1.623409 |
| Numerical aperture at the image side | 0.86 |

TABLE 6-continued

| | Coefficient |
|---|---|
| First surface | |
| RD | 0.9585706 |
| k | −0.6228111 |
| A2 | 0 |
| A4 | 0.030650946 |
| A6 | −0.017504379 |
| A8 | 0.089155889 |
| A10 | −0.14405135 |
| A12 | 0.096337291 |
| A14 | 0.03429389 |
| A16 | −0.033094205 |
| A18 | −0.11755793 |
| A20 | 0.13982484 |
| A22 | −0.009795025 |
| A24 | −0.0043785249 |
| A26 | 0.003589141 |
| A28 | 0.013443601 |
| A30 | −0.004288074 |
| Second surface | |
| RD | −1.213512 |
| k | −61.09026 |
| A2 | 0 |
| A4 | 0.7964847 |
| A6 | −5.876422 |
| A8 | 24.040845 |
| A10 | −47.499415 |
| A12 | −61.675139 |
| A14 | 548.38601 |
| A16 | −1057.3306 |
| A18 | 609.40837 |
| A20 | 157.90113 |

Figure 10:
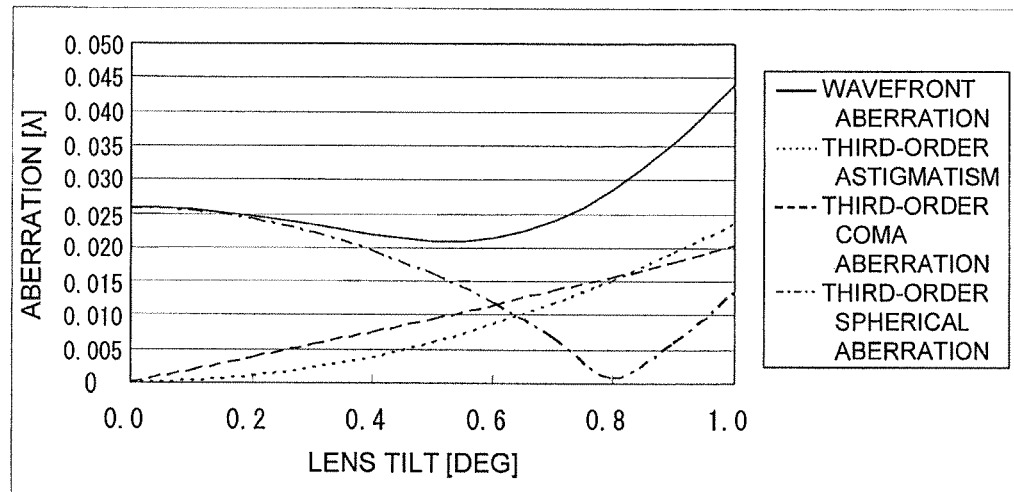
FIG. 10 is a graph showing the characteristics of an objective lens according to Example 6.

FIG. 10 shows lens tilt characteristics of the objective lens according to Example 6.

As shown in FIG. 10, the objective lens of Example 6 is designed so that a third-order coma aberration occurs when the objective lens is tilted. Thereby, a coma aberration caused by a surface tilt is offset by the aberration caused by the tilt of the objective lens, and consequently, increase in the wavefront aberration can be suppressed.

When performing recording and/or reproduction on a recording layer at the uppermost surface of a recording medium such as an optical tape, an aberration caused by a tilt of the recording medium is zero. Since the tilt of the recording medium need not be considered, the value of an aberration caused by a tilt of the objective lens with respect to the optical axis of the optical pickup is equal to the value of an aberration caused by a tilt of the light source with respect to the optical axis of the objective lens. That is, both the amount of a generated third-order coma aberration per 1 degree of tilt of the objective lens (CML) and the amount of a generated third-order coma aberration per 1 degree of tilt of the off-axis light (CMF) are 0.0201λ. Further, since recording and/or reproduction of information are performed on the recording layer at the uppermost surface of the recording medium, even if the recording medium is tilted, no third-order coma aberration occurs. That is, the amount of a generated third-order coma aberration per 1 degree of tilt of the recording medium (CMD) is zero. Accordingly, the objective lens of Example 6 satisfies formulae (2) to (4).

Figure 11:
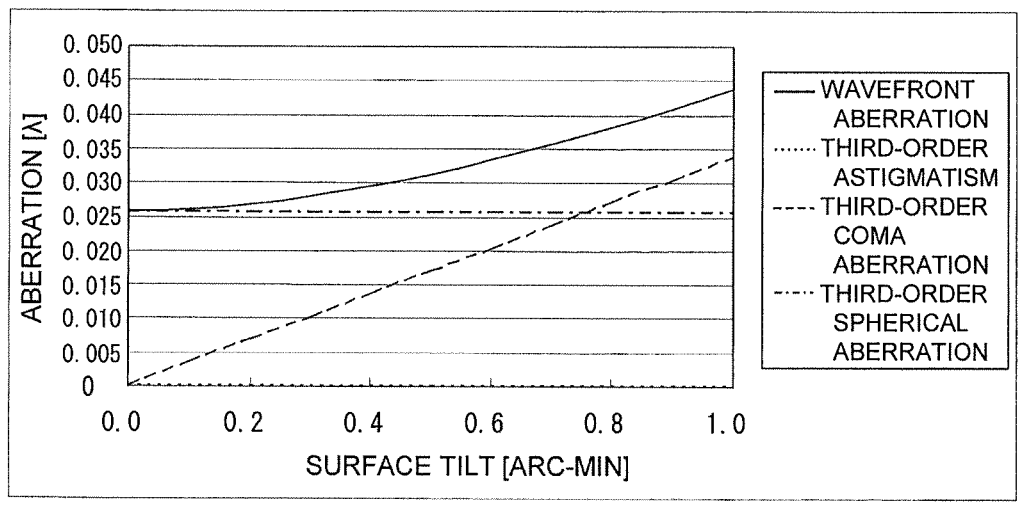
FIG. 11 is a graph showing the characteristics of the objective lens according to Example 6.

FIG. 11 shows surface tilt characteristics of the objective lens of Example 6.

As shown in FIG. 11, if a surface tilt of 0.5 arc-minute occurs in the objective lens of Example 6, the wavefront aberration is about 0.0313λ, and the third-order coma aberration is about 0.0169λ.

Figure 12:
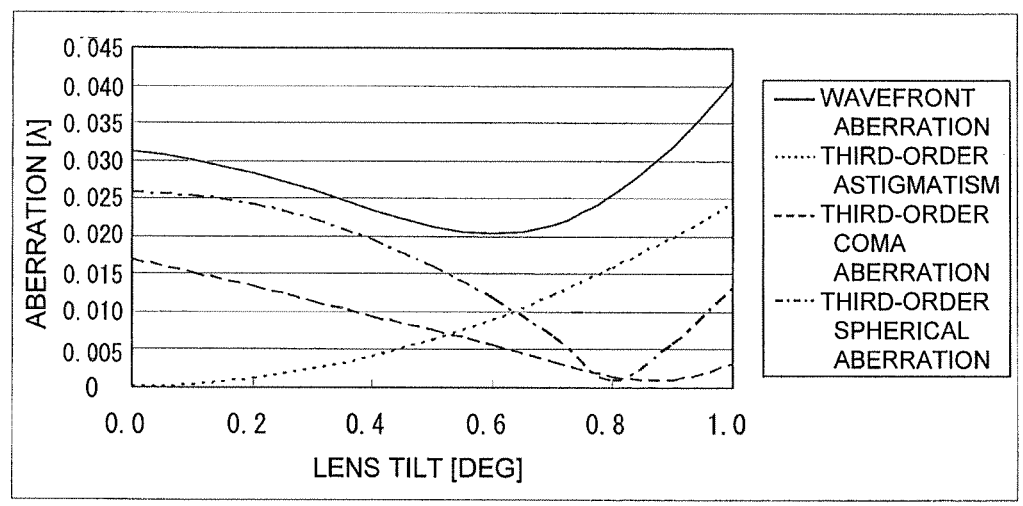
FIG. 12 is a graph showing the characteristics of the objective lens according to Example 6.

FIG. 12 shows the values of aberrations that occur when the objective lens of Example 6 is tilted so as to offset the third-order coma aberration caused by the surface tilt of 0.5 arc-minute.

As shown in FIG. 12, the third-order coma aberration can be made substantially zero by tilting the objective lens at 0.9 degree. At this time, the third-order coma aberration is 0.0009λ, which is smaller than 1/10 of the value, 0.0169λ, of the third-order coma aberration in the state where the objective lens is not tilted. Thus, the third-order coma aberration is compensated. Further, the wavefront aberration is minimized to about 0.0203λ by tilting the objective lens at 0.6 degree, and thus the wavefront aberration is improved.

Further, when the objective lens of the present example is tilted at 0.8 degree, the third-order spherical aberration has a minimum value of about 0.0008λ. The value, about 0.0008λ, of the third-order spherical aberration obtained when the objective lens of the present example is tilted at 0.8 degree is smaller than 1/10 of the value, about 0.0257λ, of the on-axis third-order spherical aberration obtained when the objective lens is not tilted.

When the objective lens of the present example has no surface tilt, the on-axis wavefront aberration is 0.0259λ, and the third-order spherical aberration is 0.0257λ. The value of the third-order spherical aberration is larger than the half of the value of the wavefront aberration.

As described above, according to the present example, it is possible to realize an objective lens which can suppress increase in aberration by tilting the objective lens, even when a surface tilt occurs in molding of the objective lens.

Example 7

An objective lens according to Example 7 performs recording and/or reproduction of information on a recording layer at the uppermost surface of an optical information recording medium, by using blue laser light having a wavelength of 408 nm. The first surface of the objective lens of the present example is an aspheric surface. The second surface of the present example is an aspheric surface to which a configuration represented by the following formula (8) is added.

$$-0.00005 \times \sqrt{6} \sin 2\theta \times R^2 \qquad (8)$$

where

R, θ are coordinates on a rotary symmetric aspheric surface of the second surface in a polar coordinate system (R, θ) whose center matches a center axis of the rotary symmetric aspheric surface.

Table 7 shows construction data of the objective lens according to Example 7.

TABLE 7

| | |
|---|---|
| Wavelength [μm] | 0.408 |
| Diameter [mm] | 2.236 |
| Thickness of center portion of lens [mm] | 1.912837 |
| Working distance [mm] | 0.3 |
| Focal length [mm] | 1.3 |
| Magnification | 0 |
| Refractive index of lens | 1.623409 |
| Numerical aperture at the image side | 0.86 |

| | Coefficient |
|---|---|
| First surface | |
| RD | 0.9551022 |
| k | −0.5762486 |
| A2 | 0 |

TABLE 7-continued

| | |
|---|---|
| A4 | 0.022996291 |
| A6 | −0.015694857 |
| A8 | 0.079944754 |
| A10 | −0.13704663 |
| A12 | 0.097249185 |
| A14 | 0.031852334 |
| A16 | −0.037901074 |
| A18 | −0.11620545 |
| A20 | 0.15375107 |
| A22 | −0.021478207 |
| A24 | −0.047692372 |
| A26 | 0.006446607 |
| A28 | 0.016822459 |
| A30 | −0.005980946 |
| Second surface | |
| RD | −1.234677 |
| k | −63.06419 |
| A2 | 0 |
| A4 | 0.75889828 |
| A6 | −4.4010902 |
| A8 | 11.984433 |
| A10 | −17.465471 |
| A12 | 10.659163 |

Figure 13:
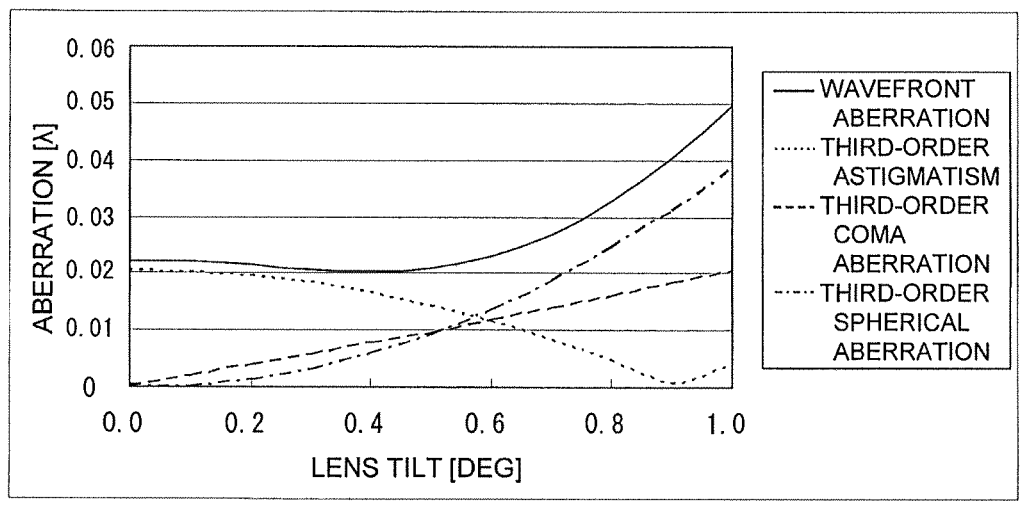
FIG. 13 is a graph showing the characteristics of an objective lens according to Example 7.

FIG. 13 shows lens tilt characteristics of the objective lens according to Example 7.

As shown in FIG. 13, the objective lens of Example 7 is designed so that a third-order coma aberration occurs when the objective lens is tilted. Thereby, a coma aberration caused by a surface tilt is offset by the aberration caused by the tilt of the objective lens, and consequently, increase in the wavefront aberration can be suppressed.

When performing recording and/or reproduction on a recording layer at the uppermost surface of a recording medium such as an optical tape, an aberration caused by a tilt of the recording medium is zero. Since the tilt of the recording medium need not be considered, the value of an aberration caused by a tilt of the objective lens with respect to the optical axis of the optical pickup is equal to the value of an aberration caused by a tilt of the light source with respect to the optical axis of the objective lens. That is, both the amount of a generated third-order coma aberration per 1 degree of tilt of the objective lens (CML) and the amount of a generated third-order coma aberration per 1 degree of tilt of the off-axis light (CMF) are 0.0205λ. Further, since recording and/or reproduction of information are performed on the recording layer at the uppermost surface of the recording medium, even if the recording medium is tilted, no third-order coma aberration occurs. That is, the amount of a generated third-order coma aberration per 1 degree of tilt of the recording medium (CMD) is zero. Accordingly, the objective lens of Example 7 satisfies formulae (2) to (4).

Figure 14:
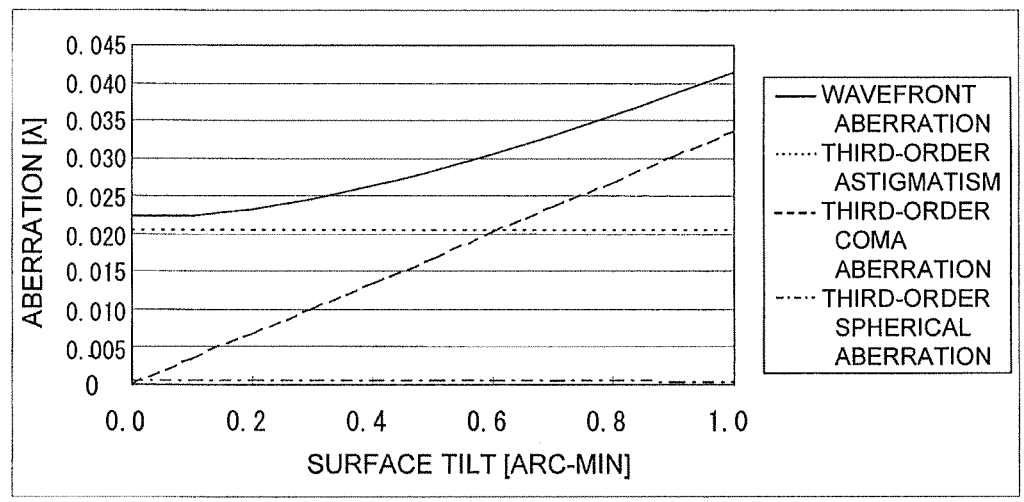
FIG. 14 is a graph showing the characteristics of the objective lens according to Example 7.

FIG. 14 shows surface tilt characteristics of the objective lens according to Example 7.

As shown in FIG. 14, if a surface tilt of 0.5 arc-minute occurs in the objective lens of Example 7, the wavefront aberration is about 0.0283λ, and the third-order coma aberration is about 0.0167λ.

Figure 15:
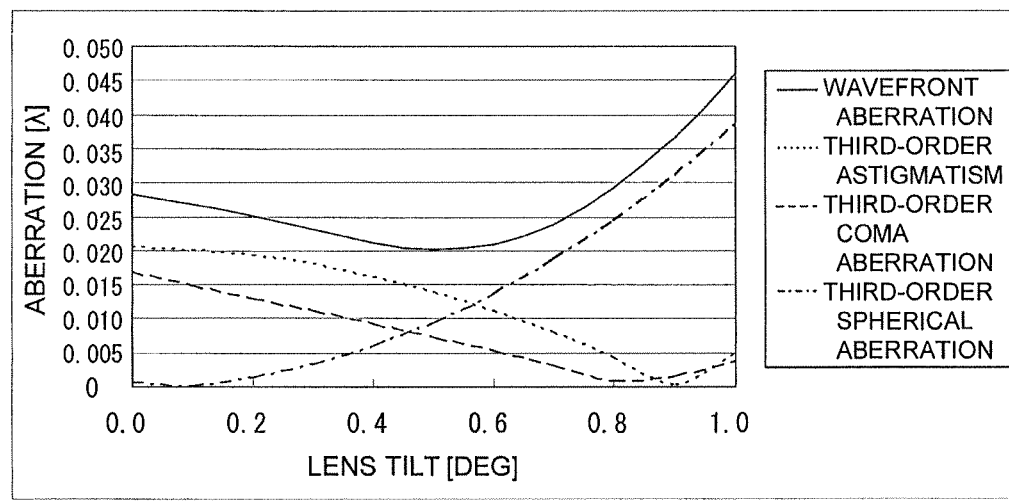
FIG. 15 is a graph showing the characteristics of the objective lens according to Example 7.

FIG. 15 shows the values of aberrations that occur when the objective lens of Example 7 is tilted so as to offset the third-order coma aberration caused by the surface tilt of 0.5 arc-minute.

The third-order coma aberration can be made substantially zero by tilting the objective lens at 0.8 degree. At this time, the third-order coma aberration is 0.0008λ, which is smaller than 1/10 of the value, 0.0167λ, of the third-order coma aberration in the state where the objective lens is not tilted. Thus, the third-order coma aberration is compensated. Further, the wavefront aberration is minimized to about 0.0203λ by tilting the objective lens at 0.5 degree, and thus the wavefront aberration is improved.

Further, when the objective lens of the present example is tilted at 0.9 degree, the third-order astigmatism has a minimum value, which is about 0.0002λ. The value, about 0.0002λ, of the third-order astigmatism obtained when the objective lens of the present example is tilted at 0.9 degree is smaller than 1/10 of the value, about 0.0204λ, of the on-axis third-order spherical aberration obtained when the objective lens is not tilted.

When the objective lens of the present example has no surface tilt, the third-order astigmatism is 0.0204λ while the on-axis wavefront aberration is 0.0223λ. The value of the third-order astigmatism is larger than the half of the value of the wavefront aberration.

As described above, according to the present example, it is possible to realize an objective lens which can suppress increase in the aberration by tilting the objective lens, even when a surface tilt occurs in molding of the objective lens.

Example 8

An objective lens according to Example 8 performs recording and/or reproduction of information on a recording layer at the uppermost surface of an optical information recording medium, by using blue laser light having a wavelength of 408 nm.

The first surface of the objective lens of the present example is an aspheric surface. The second surface of the present example is an aspheric surface to which a configuration represented by the following formula (9) is added.

$$-0.00005 \times \sqrt{6} \sin 2\theta \times R^2 \quad (9)$$

where

R, θ are coordinates on a rotary symmetric aspheric surface of the second surface in a polar coordinate system (R, θ) whose center matches a center axis of the rotary symmetric aspheric surface.

Table 8 shows construction data of the objective lens according to Example 8.

TABLE 8

| Wavelength [μm] | 0.408 |
| Diameter [mm] | 2.236 |
| Thickness of center portion of lens [mm] | 1.912614 |
| Working distance [mm] | 0.3 |
| Focal length [mm] | 1.3 |
| Magnification | 0 |
| Refractive index of lens | 1.623409 |
| Numerical aperture at the image side | 0.86 |

| | Coefficient |
| --- | --- |
| First surface | |
| RD | 0.9546959 |
| k | −0.5775654 |
| A2 | 0 |
| A4 | 0.022996291 |
| A6 | −0.015694857 |
| A8 | 0.079944754 |
| A10 | −0.13704663 |
| A12 | 0.097249185 |
| A14 | 0.031852334 |
| A16 | −0.037901074 |
| A18 | −0.11620545 |
| A20 | 0.15375107 |
| A22 | −0.021478207 |
| A24 | −0.047692372 |
| A26 | 0.006446607 |

TABLE 8-continued

| A28 | 0.016822459 |
| A30 | −0.005980946 |
| Second surface | |
| RD | −1.236625 |
| k | −61.91503 |
| A2 | 0 |
| A4 | 0.78101814 |
| A6 | −4.6193453 |
| A8 | 13.006351 |
| A10 | −19.737352 |
| A12 | 12.581796 |

Figure 16:
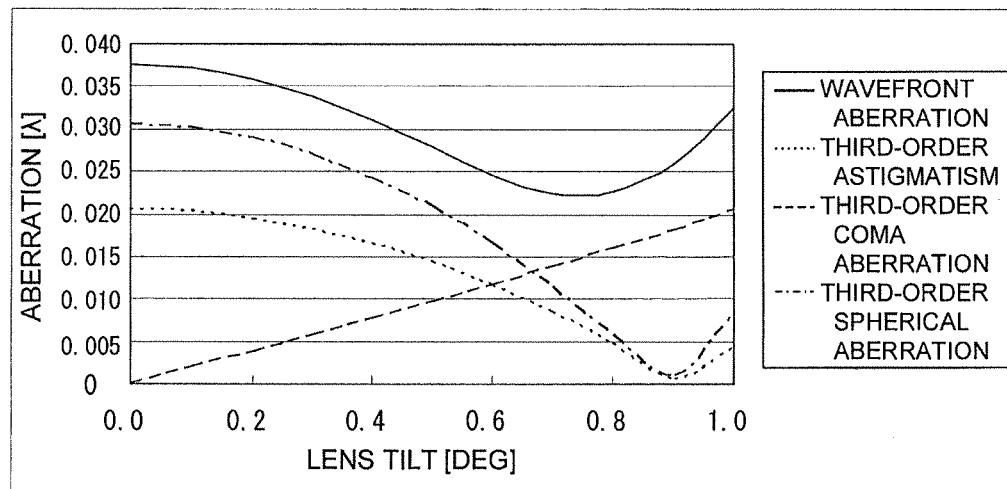
FIG. 16 is a graph showing the characteristics of an objective lens according to Example 8.

FIG. 16 shows lens tilt characteristics of the objective lens according to Example 8.

As shown in FIG. 16, the objective lens of Example 8 is designed so that a third-order coma aberration occurs when the objective lens is tilted. Thereby, a coma aberration caused by a surface tilt is offset by the aberration caused by the tilt of the objective lens, and consequently, increase in the wavefront aberration can be suppressed.

When performing recording and/or reproduction on a recording layer at the uppermost surface of a recording medium such as an optical tape, an aberration caused by a tilt of the recording medium is zero. Since the tilt of the recording medium need not be considered, the value of an aberration caused by a tilt of the objective lens with respect to the optical axis of the optical pickup is equal to the value of an aberration caused by a tilt of the light source with respect to the optical axis of the objective lens. That is, both the amount of a generated third-order coma aberration per 1 degree of tilt of the objective lens (CML) and the amount of a generated third-order coma aberration per 1 degree of tilt of the off-axis light (CMF) are 0.0205λ. Further, since recording and/or reproduction of information are performed on the recording layer at the uppermost surface of the recording medium, even if the recording medium is tilted, no third-order coma aberration occurs. That is, the amount of a generated third-order coma aberration per 1 degree of tilt of the recording medium (CMD) is zero. Accordingly, the objective lens of Example 8 satisfies formulae (2) to (4).

Figure 17:
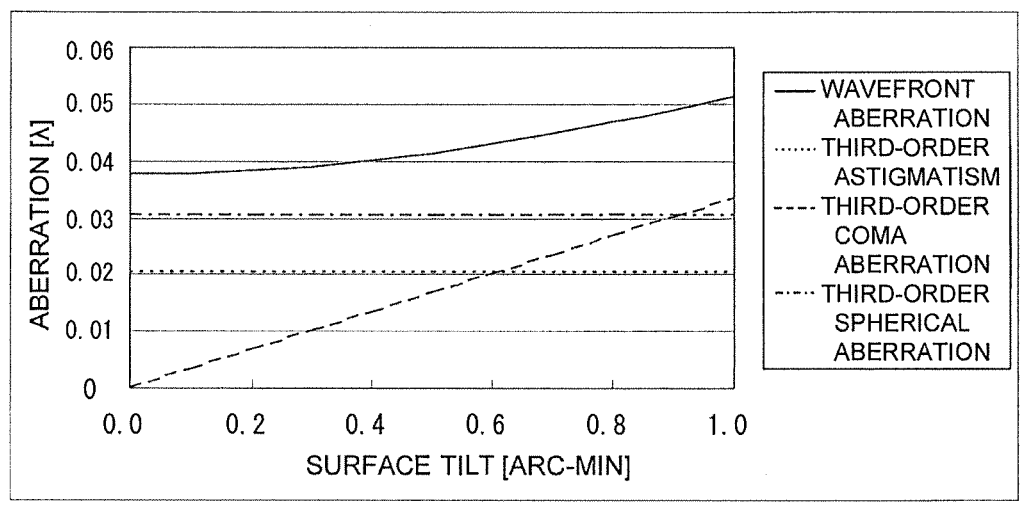
FIG. 17 is a graph showing the characteristics of the objective lens according to Example 8.

FIG. 17 shows surface tilt characteristics of the objective lens according to Example 8.

As shown in FIG. 17, for example, when a surface tilt of 0.5 arc-minute occurs in the objective lens of Example 8, the wavefront aberration is about 0.0415λ, and the third-order coma aberration is about 0.0167λ.

Figure 18:
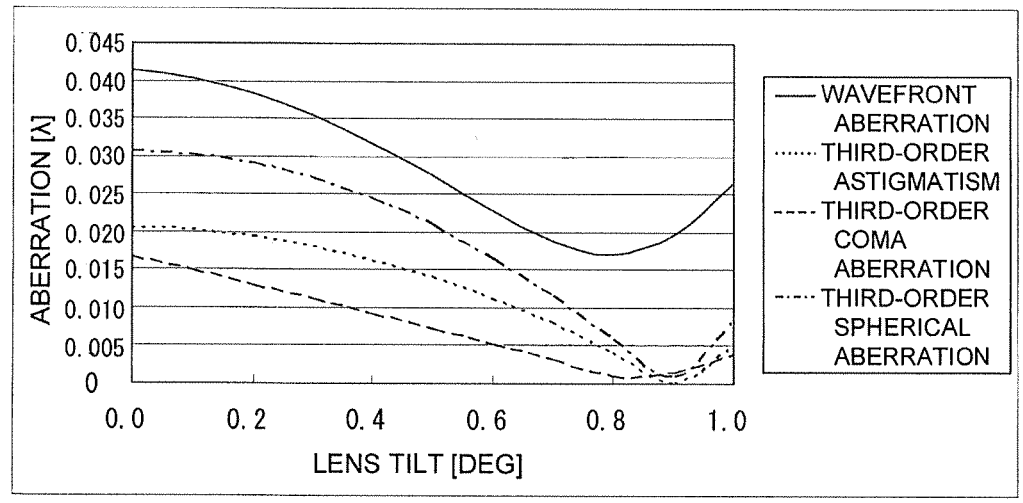
FIG. 18 is a graph showing the characteristics of the objective lens according to Example 8.

FIG. 18 shows the values of aberrations that occur when the objective lens of Example 8 is tilted so as to offset the third-order coma aberration caused by the surface tilt of 0.5 arc-minute.

The third-order coma aberration can be made substantially zero by tilting the objective lens at 0.8 degree. At this time, the third-order coma aberration is 0.0008λ, which is smaller than 1/10 of the value, 0.0167λ, of the on-axis third-order coma aberration. Thus, the third-order coma aberration is compensated. Further, the wavefront aberration is minimized to about 0.0171λ by tilting the objective lens at 0.8 degree, and thus the value of the wavefront aberration is improved.

When the objective lens of the present example is tilted at 0.9 degree, the third-order spherical aberration has a minimum value, which is about 0.0001λ. The value, about 0.0001λ, of the third-order spherical aberration obtained when the objective lens of the present example is tilted at 0.9 degree is smaller than 1/10 of the value, about 0.0305λ, of the on-axis third-order spherical aberration obtained when the objective lens is not tilted.

When the objective lens of the present example is tilted at 0.9 degree, the third-order astigmatism has a minimum value, which is about 0.0009λ. The value, about 0.0009λ, of the third-order astigmatism obtained when the objective lens of the present example is tilted at 0.9 degree is smaller than 1/10 of the value, about 0.0204λ, of the on-axis third-order astigmatism obtained when the objective lens is not tilted.

When the objective lens of the present example has no surface tilt, the third-order spherical aberration is 0.0305λ while the on-axis wavefront aberration is 0.0377λ. The value of the third-order spherical aberration is larger than the half of the value of the wavefront aberration.

When the objective lens of the present example has no surface tilt, the on-axis wavefront aberration is 0.0377λ, whereas the third-order astigmatism is 0.0204λ. The value of the third-order astigmatism is larger than the half of the value of the wavefront aberration.

As described above, according to the present example, it is possible to realize an objective lens that can suppress increase in the aberration by tilting the objective lens even when a surface tilt occurs in molding of the objective lens.

Example 9

In an objective lens according to Example 9, both the first surface and the second surface are aspheric surfaces. The objective lens of the present example performs recording and/or reproduction of information on a recording layer at the uppermost surface of an optical information recording medium by using blue laser light having a wavelength of 408 nm.

Table 9 shows construction data of the objective lens according to Example 9.

TABLE 9

| Wavelength [μm] | 0.408 |
| --- | --- |
| Diameter [mm] | 2.064 |
| Thickness of center portion of lens [mm] | 1.929811 |
| Working distance [mm] | 0.22 |
| Focal length [mm] | 1.2 |
| Magnification | 0 |
| Refractive index of lens | 1.623409 |
| Numerical aperture at the image side | 0.86 |

| | Coefficient |
| --- | --- |
| First surface | |
| RD | 0.9075647 |
| k | −0.6417746 |
| A2 | 0 |
| A4 | 0.034318861 |
| A6 | 0.006564579 |
| A8 | 0.051334998 |
| A10 | −0.11195682 |
| A12 | 0.11344073 |
| A14 | 0.0228949 |
| A16 | −0.059315913 |
| A18 | −0.14200208 |
| A20 | 0.17021001 |
| A22 | 0.014810596 |
| A24 | −0.030276427 |
| A26 | −0.024251867 |
| A28 | −0.011083429 |
| A30 | 0.015371871 |
| Second surface | |
| RD | −0.7782098 |
| k | −36.0255 |
| A2 | 0 |
| A4 | 2.7112875 |
| A6 | −39.443898 |

TABLE 9-continued

| A8 | 318.76743 |
| --- | --- |
| A10 | −1190.5475 |
| A12 | −2344.6486 |
| A14 | 43028.051 |
| A16 | −168887.5 |
| A18 | 261429.63 |
| A20 | −97267.725 |

Figure 19:
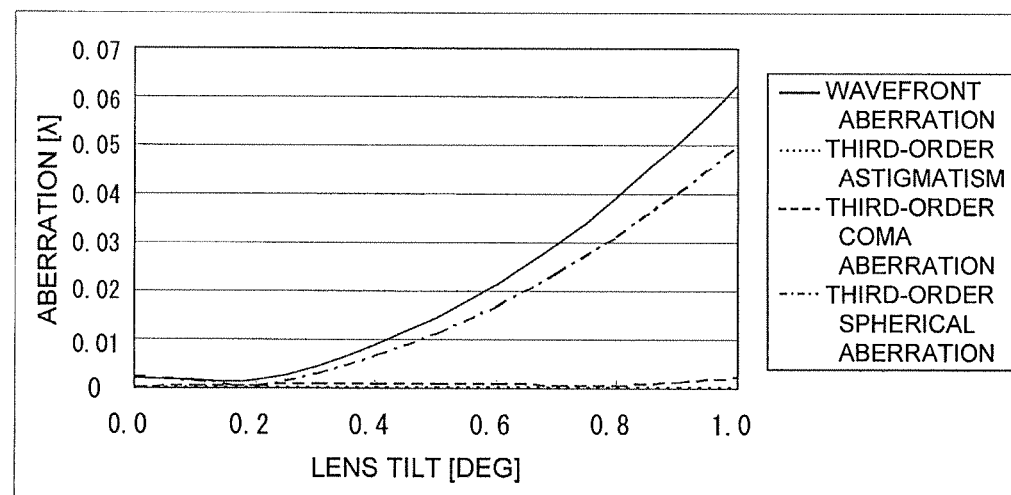
FIG. 19 is a graph showing the characteristics of an objective lens according to Example 9.

FIG. 19 shows lens tilt characteristics of Example 9.

As shown in FIG. 19, even when the objective lens is tilted at 1 degree with respect to the reference optical axis, the value of the wavefront aberration is smaller than the Marechal criterion (wavefront aberration<0.07λ). Therefore, the objective lens satisfies the imaging performance required of an optical pickup lens.

Further, when performing recording and/or reproduction on a recording layer at the uppermost surface of a recording medium such as an optical tape, an aberration caused by a tilt of the recording medium is zero. Since the tilt of the recording medium need not be considered, a tilt of the objective lens with respect to the optical axis of the optical pickup device can be rephrased as a tilt of the light source with respect to the optical axis of the objective lens. That is, the objective lens satisfies the imaging performance even when incident light obliquely enters the objective lens. In the case of Example 9, even when incident light enters at a tilt of 1 degree, the value of the wavefront aberration is smaller than the Marechal criterion. Therefore, the objective lens satisfies the imaging performance required of an optical pickup lens.

At this time, both the amount of a generated third-order coma aberration per 1 degree of tilt of the objective lens (CML) and the amount of a generated third-order coma aberration per 1 degree of tilt of the off-axis light (CMF) are 0.0020λ. Accordingly, the objective lens of the present example satisfies formula (1).

Further, since recording and/or reproduction of information are performed on the recording layer at the uppermost surface of the recording medium, even if the recording medium is tilted, no third-order coma aberration occurs. That is, the amount of a generated third-order coma aberration per 1 degree of tilt of the recording medium (CMD) is zero. Accordingly, the objective lens of the present example satisfies formula (2).

In an optical pickup for BD, it is needed to compensate an aberration caused by a tilt of a recording medium by tilting an objective lens or the pickup device. However, the objective lens of Example 9 need not perform such an operation because no aberration is caused by a tilt of the recording medium.

By using the objective lens of the present example, it is possible to realize an optical pickup device in which occurrence of an aberration is suppressed with respect to a tilt of the recording medium, a tilt of the objective lens when it is installed, a tilt of incident light, and a tilt of the optical pickup device itself.

Example 10

In an objective lens according to Example 10, both the first surface and the second surface are aspheric surfaces. The objective lens of the present example performs recording and/or reproduction of information on a recording layer at the uppermost surface of an optical information recording medium by using blue laser light having a wavelength of 408 nm.

Table 10 shows construction data of the objective lens according to Example 10.

TABLE 10

| Wavelength [μm] | 0.408 |
|---|---|
| Diameter [mm] | 2.236 |
| Thickness of center portion of lens [mm] | 1.92573 |
| Working distance [mm] | 0.3 |
| Focal length [mm] | 1.3 |
| Magnification | 0 |
| Refractive index of lens | 1.623409 |
| Numerical aperture at the image side | 0.86 |

| | Coefficient |
|---|---|
| First surface | |
| RD | 0.9617137 |
| k | −0.622778 |
| A2 | 0 |
| A4 | 0.029895665 |
| A6 | −0.016404821 |
| A8 | 0.085638711 |
| A10 | −0.14442465 |
| A12 | 0.10060327 |
| A14 | 0.033332485 |
| A16 | −0.036170421 |
| A18 | −0.11924289 |
| A20 | 0.1414299 |
| A22 | −0.007723625 |
| A24 | −0.043176052 |
| A26 | 0.002408979 |
| A28 | 0.012023827 |
| A30 | −0.00331681 |
| Second surface | |
| RD | −1.191761 |
| k | −59.84114 |
| A2 | 0 |
| A4 | 0.6894962 |
| A6 | −5.1761604 |
| A8 | 21.181007 |
| A10 | −41.978503 |
| A12 | −60.111815 |
| A14 | 540.10447 |
| A16 | −1125.6375 |
| A18 | 808.96831 |
| A20 | 19.114693 |

Figure 20:
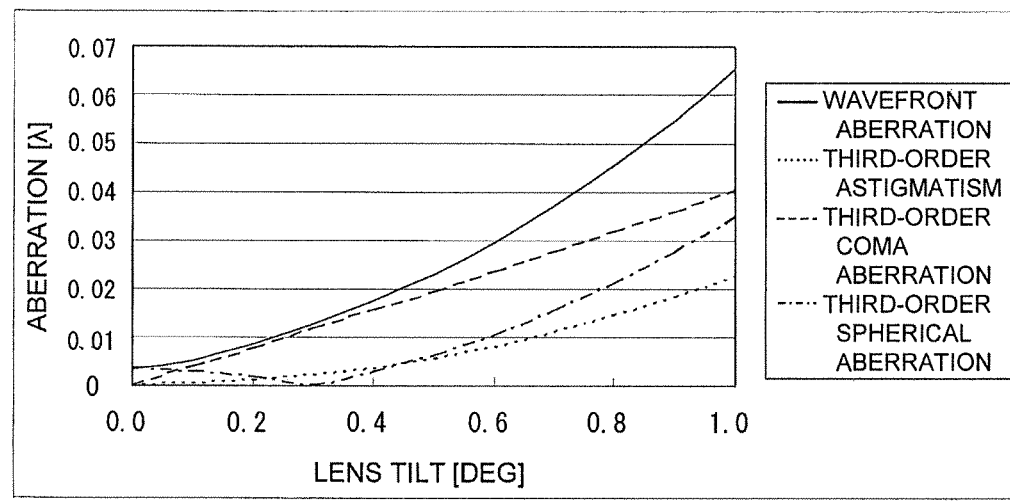
FIG. 20 is a graph showing the characteristics of an objective lens according to Example 10.

FIG. 20 shows lens tilt characteristics of the objective lens according to Example 10.

As shown in FIG. 20, the objective lens of Example 10 is designed so that a third-order coma aberration occurs when the objective lens is tilted. Thereby, a coma aberration caused by a surface tilt is offset by the coma aberration caused by the tilt of the objective lens, and consequently, increase in the wavefront aberration can be suppressed.

When performing recording and/or reproduction on a recording layer at the uppermost surface of a recording medium such as an optical tape, an aberration caused by a tilt of the recording medium is zero. Since the tilt of the recording medium need not be considered, the value of an aberration caused by a tilt of the objective lens with respect to the optical axis of the optical pickup is equal to the value of an aberration caused by a tilt of the light source with respect to the optical axis of the objective lens. Therefore, the amount of a generated third-order coma aberration per 1 degree of tilt of the objective lens (CML) and the amount of a generated third-order coma aberration per 1 degree of tilt of the off-axis light (CMF) are both 0.0402λ. Further, since recording and/or reproduction of information are performed on the recording layer at the uppermost surface of the recording medium, even if the recording medium is tilted, no third-order coma aberration occurs. That is, the amount of a generated third-order coma aberration per 1 degree of tilt of the recording medium (CMD) is zero. Accordingly, the objective lens of Example 10 satisfies formulae (3) and (4).

Figure 21:
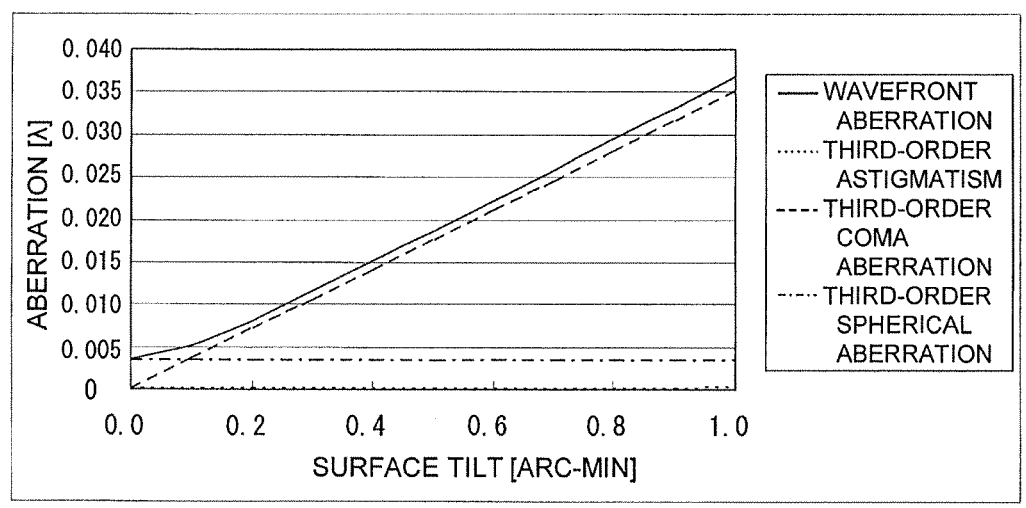
FIG. 21 is a graph showing the characteristics of an objective lens according to Example 10.

FIG. 21 shows surface tilt characteristics of the objective lens according to Example 10.

As shown in FIG. 21, for example, when a surface tilt of 0.5 arc-minute occurs in the objective lens of Example 10, the wavefront aberration is about 0.0187λ, and the third-order coma aberration is about 0.0175λ.

Figure 22:
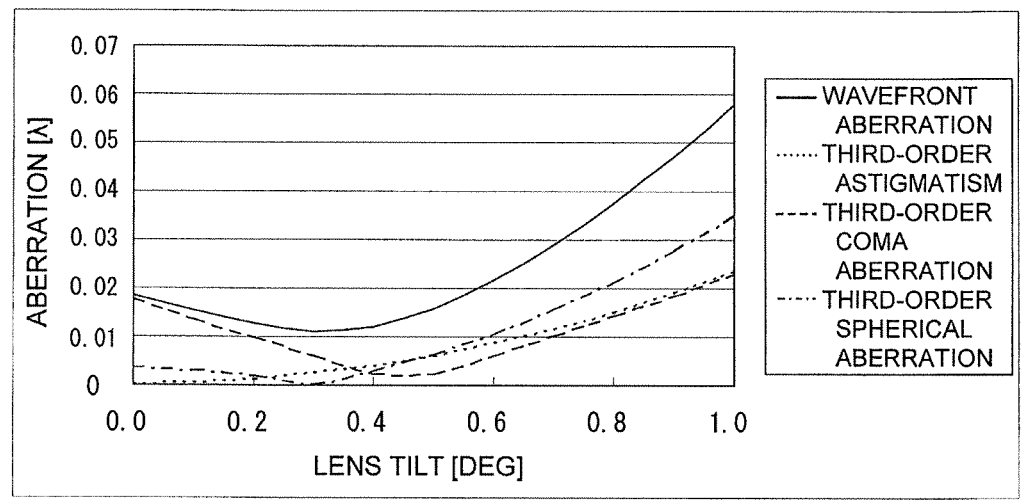
FIG. 22 is a graph showing the characteristics of the objective lens according to Example 10.

FIG. 22 shows the values of aberrations that occur when the objective lens of Example 10 is tilted so as to offset the third-order coma aberration caused by the surface tilt of 0.5 arc-minute.

As shown in FIG. 22, the third-order coma aberration can be made substantially zero by tilting the objective lens at 0.45 degree. At this time, the third-order coma aberration is approximately 0λ, which is sufficiently smaller than the value, 0.0175λ, of the third-order coma aberration in the state where the objective lens is not tilted. Further, the wavefront aberration is minimized to about 0.0112λ by tilting the objective lens at 0.3 degree, and thus the wavefront aberration is improved.

As described above, according to the present example, it is possible to realize an objective lens which can suppress increase in the aberration by tilting the objective lens even when a surface tilt occurs in molding of the objective lens.

Example 11

In an objective lens according to Example 11, both the first surface and the second surface are aspheric surfaces. The objective lens of the present example performs recording and/or reproduction of information on a recording layer via a cover layer having a thickness of 0.01 mm and provided at the uppermost surface of an optical information recording medium, by using blue laser light having a wavelength of 408 nm.

Table 11 shows construction data of the objective lens according to Example 11.

TABLE 11

| Wavelength [μm] | 0.408 |
|---|---|
| Diameter [mm] | 2.236 |
| Thickness of center portion of lens [mm] | 1.901527 |
| Working distance [mm] | 0.3 |
| Focal length [mm] | 1.3 |
| Magnification | 0 |
| Refractive index of lens | 1.623409 |
| Numerical aperture at the image side | 0.86 |
| Refractive index of cover layer | 1.61642 |
| Thickness of cover layer | 0.01 |

| | Coefficient |
|---|---|
| First surface | |
| RD | 0.9554473 |
| k | −0.6103213 |
| A2 | 0 |
| A4 | 0.027038348 |
| A6 | −0.013166019 |
| A8 | 0.082204887 |
| A10 | −0.14267118 |
| A12 | 0.10138073 |
| A14 | 0.034887884 |
| A16 | −0.036293438 |
| A18 | −0.12046597 |
| A20 | 0.14062093 |
| A22 | −0.007489428 |
| A24 | −0.04316366 |
| A26 | 0.003325794 |

TABLE 11-continued

| | |
|---|---|
| A28 | 0.011453837 |
| A30 | −0.003224919 |
| Second surface | |
| RD | −1.25925 |
| k | −54.96617 |
| A2 | 0 |
| A4 | 0.85591281 |
| A6 | −5.752277 |
| A8 | 22.324129 |
| A10 | −60.482235 |
| A12 | 108.70028 |
| A14 | −114.5216 |
| A16 | 52.928822 |

Figure 23:
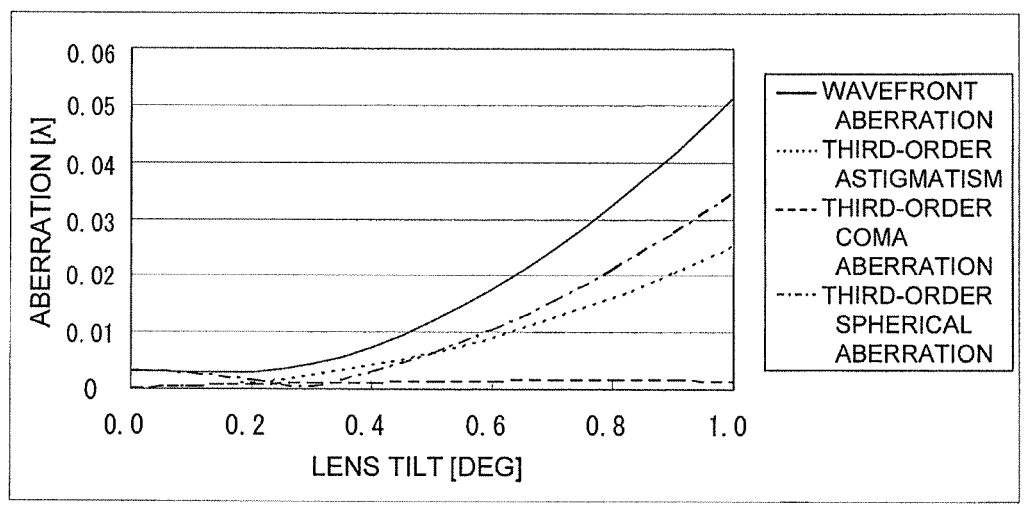
FIG. 23 is a graph showing the characteristics of an objective lens according to Example 11.

FIG. 23 shows lens tilt characteristics of Example 11.

As shown in FIG. 23, even when the objective lens is tilted at 1 degree with respect to the reference optical axis, the value of the wavefront aberration is smaller than the Marechal criterion (wavefront aberration<0.07λ). Therefore, the objective lens satisfies the imaging performance required of an optical pickup lens. At this time, the amount of a generated third-order coma aberration per 1 degree of tilt of the objective lens (CML) is 0.0012λ.

In Example 11, recording and/or reproduction of information are performed on the recording layer via a cover layer having a thickness of 0.01 mm from the uppermost surface of the optical information recording medium. Accordingly, a tilt of the recording medium also causes variation in the value of the aberration. Therefore, the amount of a generated third-order coma aberration per 1 degree of tilt of the objective lens (CML) is different from the amount of a generated third-order coma aberration per 1 degree of tilt of the off-axis light (CMF).

Figure 24:
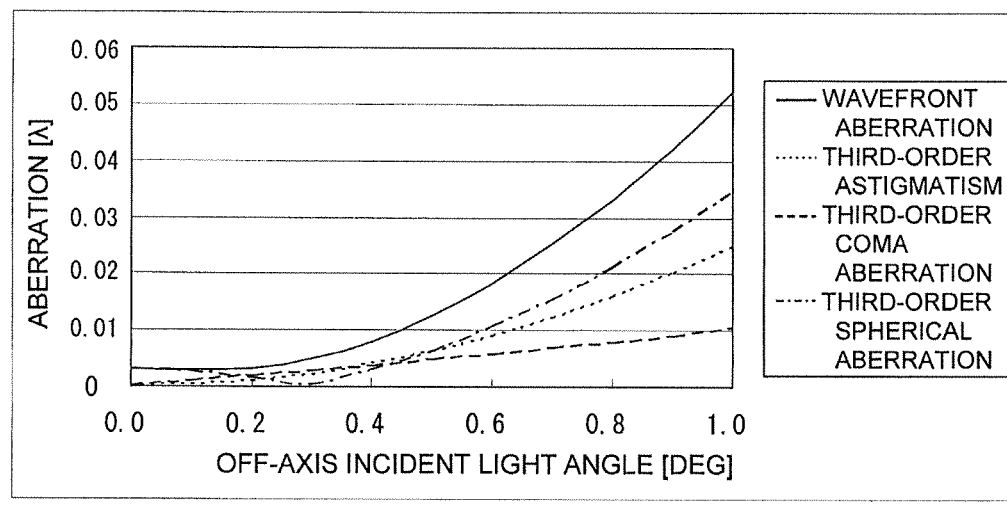
FIG. 24 is a graph showing the characteristics of the objective lens according to Example 11.

FIG. 24 shows the values of aberrations that occur when off-axis light enters the objective lens of Example 11.

As shown in FIG. 24, the amount of a generated third-order coma aberration per 1 degree of tilt of the off-axis light (CMF) is 0.0103λ. Accordingly, the objective lens of Example 11 satisfies formula (1).

Figure 25:
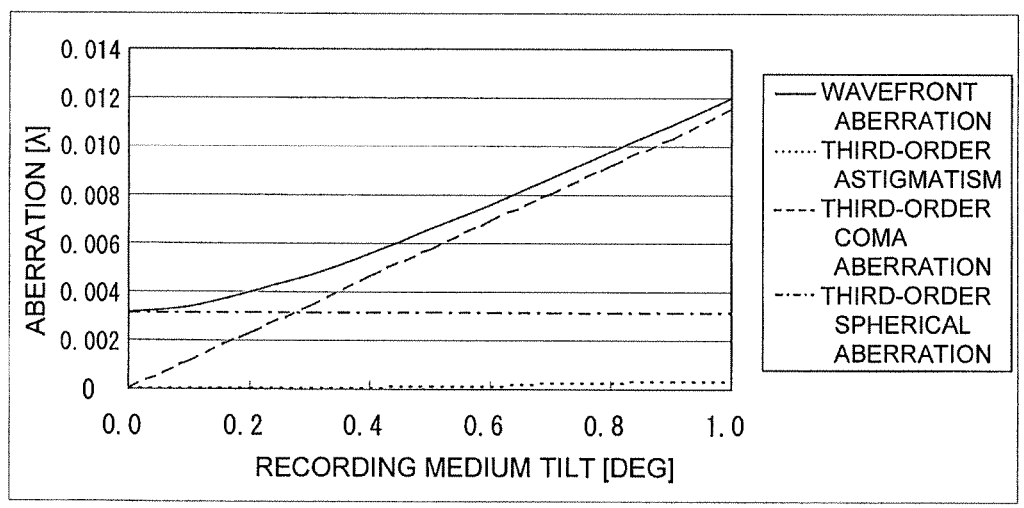
FIG. 25 is a graph showing the characteristics of the objective lens according to Example 11.

FIG. 25 shows the values of aberrations that occur when the recording medium is tilted in the case where recording and/or reproduction are performed by using the objective lens of Example 11.

As shown in FIG. 25, the amount of a generated third-order coma aberration per 1 degree of tilt of the recording medium (CMD) is 0.0115λ. Accordingly, the objective lens of Example 11 satisfies formula (2).

By using the objective lens of the present example, it is possible to realize an optical pickup device in which occurrence of an aberration is suppressed with respect to a tilt of the recording medium, a tilt of the objective lens when it is installed, a tilt of incident light, and a tilt of the optical pickup device itself.

Example 12

An objective lens according to Example 12 is an objective lens which performs recording and/or reproduction of information on a recording layer via a cover layer having a thickness of 0.01 mm from the uppermost surface of an optical information recording medium, by using blue laser light having a wavelength of 408 nm.

The first surface of the objective lens of Example 12 is an aspheric surface. The second surface of the objective lens of Example 12 is an aspheric surface to which a configuration represented by the following formula (10) is added.

$$0.00002 \times \sqrt{6} \sin 2\theta \times R^2 \quad (10)$$

where

R, θ are coordinates on a rotary symmetric aspheric surface of the second surface in a polar coordinate system (R, θ) whose center matches a center axis of the rotary symmetric aspheric surface.

Table 12 shows construction data of the objective lens according to Example 12.

TABLE 12

| | |
|---|---|
| Wavelength [μm] | 0.408 |
| Diameter [mm] | 2.236 |
| Thickness of center portion of lens [mm] | 1.904126 |
| Working distance [mm] | 0.3 |
| Focal length [mm] | 1.3 |
| Magnification | 0 |
| Refractive index of lens | 1.623409 |
| Numerical aperture at the image side | 0.86 |
| Refractive index of cover layer | 1.61642 |
| Thickness of cover layer | 0.01 |

| | Coefficient |
|---|---|
| First surface | |
| RD | 0.9571312 |
| k | −0.5835657 |
| A2 | 0 |
| A4 | 0.027303899 |
| A6 | −0.026369751 |
| A8 | 0.10017606 |
| A10 | −0.1527394 |
| A12 | 0.093943855 |
| A14 | 0.038674558 |
| A16 | −0.033854794 |
| A18 | −0.11733606 |
| A20 | 0.15029832 |
| A22 | −0.023360305 |
| A24 | −0.04773959 |
| A26 | 0.008408509 |
| A28 | 0.018710385 |
| A30 | −0.007585684 |
| Second surface | |
| RD | −1.252893 |
| k | −62.97245 |
| A2 | 0 |
| A4 | 0.70745557 |
| A6 | −4.2825622 |
| A8 | 12.486832 |
| A10 | −19.843538 |
| A12 | 13.169632 |

Figure 26:
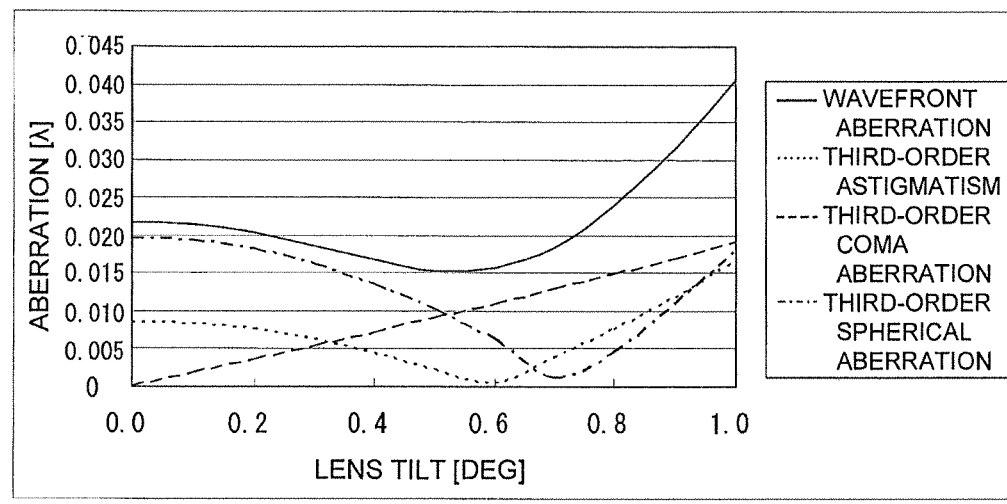
FIG. 26 is a graph showing the characteristics of an objective lens according to Example 12.

FIG. 26 shows lens tilt characteristics of the objective lens according to Example 12.

As shown in FIG. 26, the objective lens of Example 12 is designed so that a third-order coma aberration occurs when the objective lens is tilted. Thereby, a coma aberration caused by a surface tilt is offset by the coma aberration caused by the tilt of the objective lens, and consequently, increase in the wavefront aberration can be suppressed. The amount of a generated third-order coma aberration per 1 degree of tilt of the objective lens (CML) is 0.0191λ.

In Example 12, recording and/or reproduction of information is performed on the recording layer via a cover layer having a thickness of 0.01 mm from the uppermost surface of the optical information recording medium. Accordingly, a tilt of the recording medium also causes variation in the value of the aberration. Therefore, the amount of a generated third-order coma aberration per 1 degree of tilt of the objective lens (CML) is different from the amount of a generated third-order coma aberration per 1 degree of tilt of the off-axis light (CMF).

Figure 27:
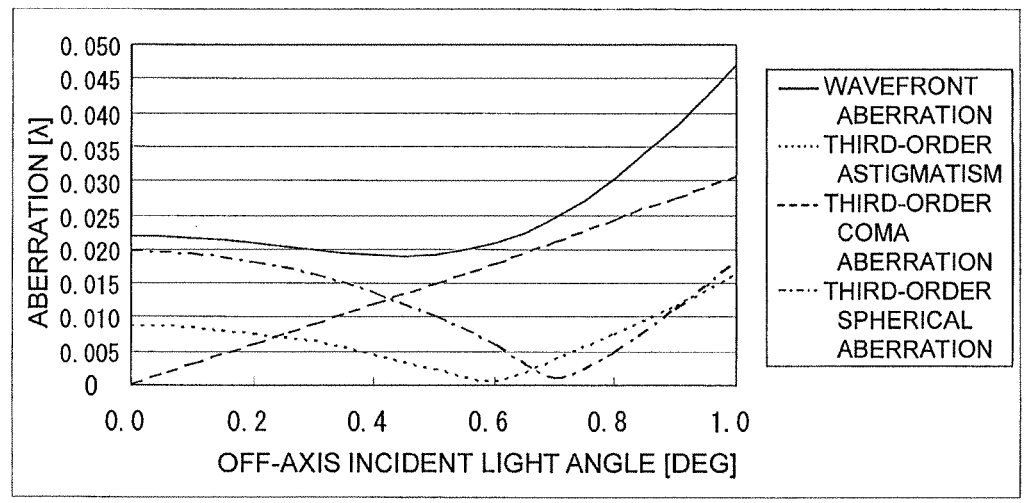
FIG. 27 is a graph showing the characteristics of the objective lens according to Example 12.

FIG. 27 shows the aberrations that occur when off-axis light enters the objective lens of Example 12.

At this time, the amount of a generated third-order coma aberration per 1 degree of tilt of the off-axis light (CMF) is 0.0306λ.

Figure 28:
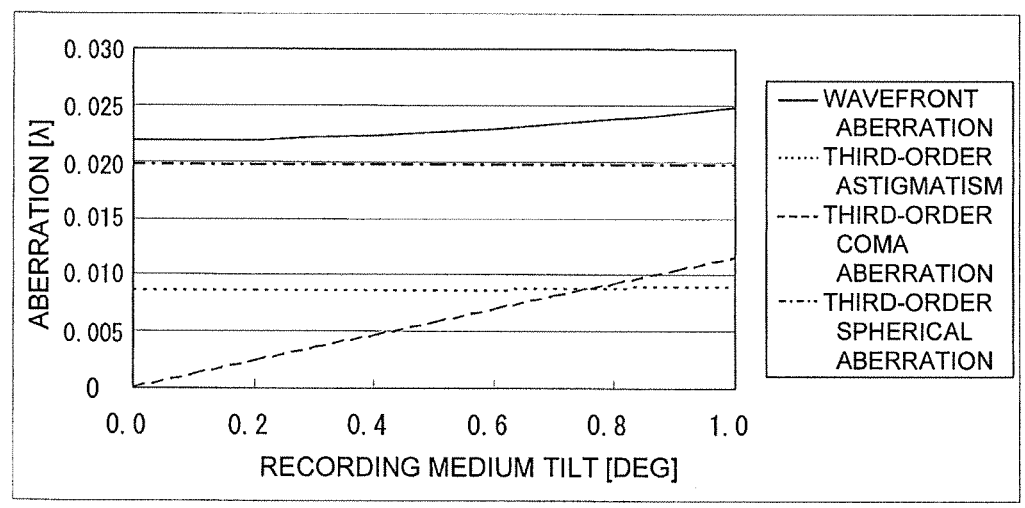
FIG. 28 is a graph showing the characteristics of the objective lens according to Example 12.

FIG. 28 shows the aberrations that occur when the recording medium is tilted in the case where recording and/or reproduction are performed by using the objective lens of Example 12.

The amount of a generated third-order coma aberration per 1 degree of tilt of the recording medium (CMD) is 0.0115λ.

Consequently, Example 12 satisfies formulae (3) and (4).

Figure 29:
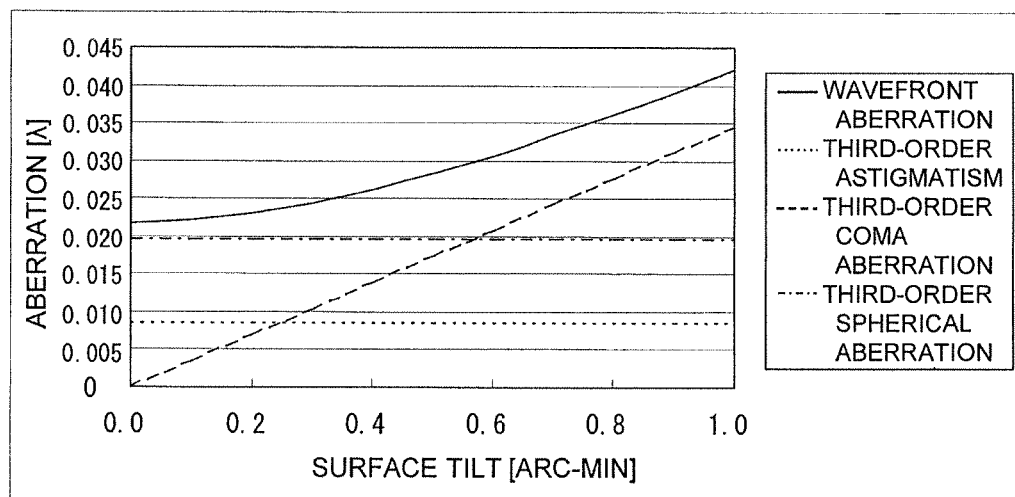
FIG. 29 is a graph showing the characteristics of the objective lens according to Example 12.

FIG. 29 shows surface tilt characteristics of the objective lens according to Example 12.

As shown in FIG. 29, for example, when a surface tilt of 0.5 arc-minute occurs in the objective lens of Example 12, the wavefront aberration is about 0.0283λ, and the third-order coma aberration is about 0.0172λ.

Figure 30:
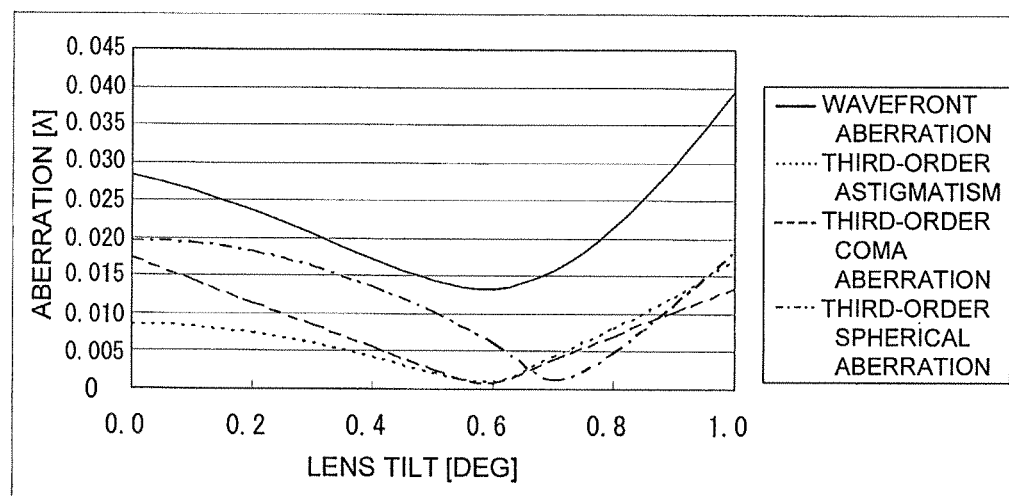
FIG. 30 is a graph showing the characteristics of the objective lens according to Example 12.

FIG. 30 shows the values of aberrations that occur when the objective lens of Example 12 is tilted so as to offset the third-order coma aberration caused by the surface tilt of 0.5 arc-minute.

As shown in FIG. 30, the third-order coma aberration can be made substantially zero by tilting the objective lens at 0.6 degree. At this time, the third-order coma aberration is 0.0006λ, which is smaller than the value, 0.0172λ, of the third-order coma aberration in the state where the objective lens is not tilted. Thus, the third-order coma aberration is compensated. Further, the wavefront aberration is minimized to about 0.0134λ by tilting the objective lens at 0.6 degree, and thus the wavefront aberration is improved.

When the objective lens of the present example is tilted at 0.7 degree, the third-order spherical aberration has a minimum value, which is about 0.0012λ. The value, about 0.0012λ, of the third-order spherical aberration obtained when the objective lens of the present example is tilted at 0.7 degree is smaller than 1/10 of the value, about 0.0196λ, of the on-axis third-order spherical aberration obtained when the objective lens is not tilted.

When the objective lens of the present example is tilted at 0.6 degree, the third-order astigmatism has a minimum value, which is about 0.0005λ. The value, about 0.0005λ, of the third-order astigmatism obtained when the objective lens of the present example is tilted at 0.6 degree is smaller than 1/10 of the value, about 0.0085λ, of the on-axis third-order astigmatism obtained when the objective lens is not tilted.

When the objective lens of the present example has no surface tilt, the third-order spherical aberration is 0.0196λ while the on-axis wavefront aberration is 0.0218λ. The value of the third-order spherical aberration is larger than the half of the value of the wavefront aberration.

As described above, according to the present example, it is possible to realize an objective lens which can suppress increase in the aberration by tilting the objective lens, even when a surface tilt occurs in molding of the objective lens.

The present disclosure is applicable to: an optical pickup device and an optical information recording device which perform recording/reproduction or erasing of information on a recording medium by using light; and an objective lens for use in the optical pickup device. In particular, the present disclosure is applicable to an objective lens suitable for a tape-shaped recording medium.

As presented above, embodiments have been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. An objective lens, wherein:
the objective lens is configured to converge light of a predetermined wavelength λ on a recording surface of a recording medium, the recording surface being provided at an uppermost surface of the recording medium or at a lower layer beneath a cover layer provided at an uppermost layer of the recording medium, the thickness of the cover layer being not more than 10 μm, and
the objective lens satisfies the following condition:

$$|CML|+|CMF|<0.03\lambda,$$

where
CML is an amount of a generated third-order coma aberration per 1 degree of tilt of the objective lens, and
CMF is an amount of a generated third-order coma aberration per 1 degree of tilt of off-axis light.

2. The objective lens according to claim 1, further satisfying the following condition:

$$|CML|+|CMF|+|CMD|<0.06\lambda,$$

where CMD is an amount of a generated third-order coma aberration per 1 degree of tilt of the recording medium.

3. The objective lens according to claim 1, wherein a wavefront aberration has a minimum value when the tilt of the objective lens is in a range larger than 0 degree and smaller than 1 degree.

4. The objective lens according to claim 1, wherein a third-order spherical aberration or a third-order astigmatism has a minimum value when the tilt of the objective lens is in a range larger than 0 degree and smaller than 1 degree.

5. The objective lens according to claim 4, wherein the minimum value of the third-order spherical aberration or the third-order astigmatism is smaller than 1/10 of a value of an on-axis third-order spherical aberration or an on-axis third-order astigmatism.

6. The objective lens according to claim 1, wherein the value of the on-axis third-order spherical aberration or the on-axis third-order astigmatism is larger than the half of a value of an on-axis wavefront aberration.

7. The objective lens according to claim 1, wherein
the predetermined wavelength λ is 380 to 430 nm,
the objective lens has a numerical aperture of 0.8 or larger, and
the objective lens is a single lens having a focal length of 1.3 mm or shorter.

8. An optical pickup device including the objective lens according to claim 1.

* * * * *